US012596743B2

(12) United States Patent
Vang et al.

(10) Patent No.: US 12,596,743 B2
(45) Date of Patent: *Apr. 7, 2026

(54) METHOD, APPARATUS, SYSTEM, AND NON-TRANSITORY COMPUTER READABLE MEDIUM FOR PERFORMING IMAGE SEARCH VERIFICATION USING AN ONLINE PLATFORM

(71) Applicant: Find My, LLC, El Paso, TX (US)

(72) Inventors: Xoua Vang, New York, NY (US);
Alejandra Baca, El Paso, TX (US);
David Lin, New York, NY (US)

(73) Assignee: Find My, LLC, El Paso, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,099

(22) Filed: Jan. 31, 2024

(65) Prior Publication Data

US 2024/0168990 A1 May 23, 2024

Related U.S. Application Data

(63) Continuation of application No. 17/220,464, filed on Apr. 1, 2021, now Pat. No. 11,907,282.

(51) Int. Cl.
*G06F 16/532* (2019.01)
*G06F 16/535* (2019.01)
(Continued)

(52) U.S. Cl.
CPC .......... *G06F 16/532* (2019.01); *G06F 16/535* (2019.01); *G06F 16/538* (2019.01);
(Continued)

(58) Field of Classification Search
None
See application file for complete search history.

(56) References Cited

U.S. PATENT DOCUMENTS 8,600,832 B2    12/2013 Jung et al.
9,817,900 B2    11/2017 Yan et al.
(Continued)

FOREIGN PATENT DOCUMENTS

CN          111522989 B    10/2020
GB            2584780 A    12/2020

*Primary Examiner* — Bernard Krasnic
(74) *Attorney, Agent, or Firm* — Harness, Dickey & Pierce, P.L.C.

(57) ABSTRACT

A system, apparatus, method, and non-transitory computer readable medium for performing image search verification using an online platform may include a memory storing computer readable instructions and a database corresponding to a neural network associated with the online platform, and processing circuitry configured to execute the computer readable instructions. The processing circuitry may cause the server to receive an image-based search query from a first user device, the image-based search query including at least one image including a search object, and search query parameters related to the search object, analyze the search object using the neural network to determine an object type of the search object and at least one object type specific characteristic of the search object, and receive at least one search result response from at least one second user device.

19 Claims, 12 Drawing Sheets

(51) Int. Cl.

| | |
|---|---|
| *G06F 16/538* | (2019.01) |
| *G06F 16/583* | (2019.01) |
| *G06F 40/30* | (2020.01) |
| *G06N 3/04* | (2023.01) |
| *G06N 3/063* | (2023.01) |
| *G06Q 10/087* | (2023.01) |
| *G06V 10/82* | (2022.01) |

(52) U.S. Cl.
CPC ...... *G06F 16/5838* (2019.01); *G06F 16/5854* (2019.01); *G06F 40/30* (2020.01); *G06N 3/04* (2013.01); *G06N 3/063* (2013.01); *G06Q 10/087* (2013.01); *G06V 10/82* (2022.01)

(56) References Cited

U.S. PATENT DOCUMENTS

| | | | |
|---|---|---|---|
| 9,916,538 | B2 | 3/2018 | Zadeh et al. |
| 11,907,282 | B2 * | 2/2024 | Vang .................... G06Q 10/087 |
| 2013/0226646 | A1 | 8/2013 | Watkins et al. |
| 2014/0095463 | A1 | 4/2014 | Pappas |
| 2018/0012282 | A1 | 1/2018 | Mattingly et al. |
| 2018/0060360 | A1 | 3/2018 | Majkowska et al. |
| 2018/0137551 | A1 | 5/2018 | Zheng et al. |
| 2018/0150566 | A1 | 5/2018 | Kim et al. |
| 2018/0276473 | A1 | 9/2018 | Kim et al. |
| 2020/0142978 | A1 | 5/2020 | Salokhe et al. |
| 2023/0040513 | A1 | 2/2023 | Ryan |

\* cited by examiner

2000

Processor
2100

Bus
2200

Network Interface
2400

I/O Device(s)
2500

Memory
2300

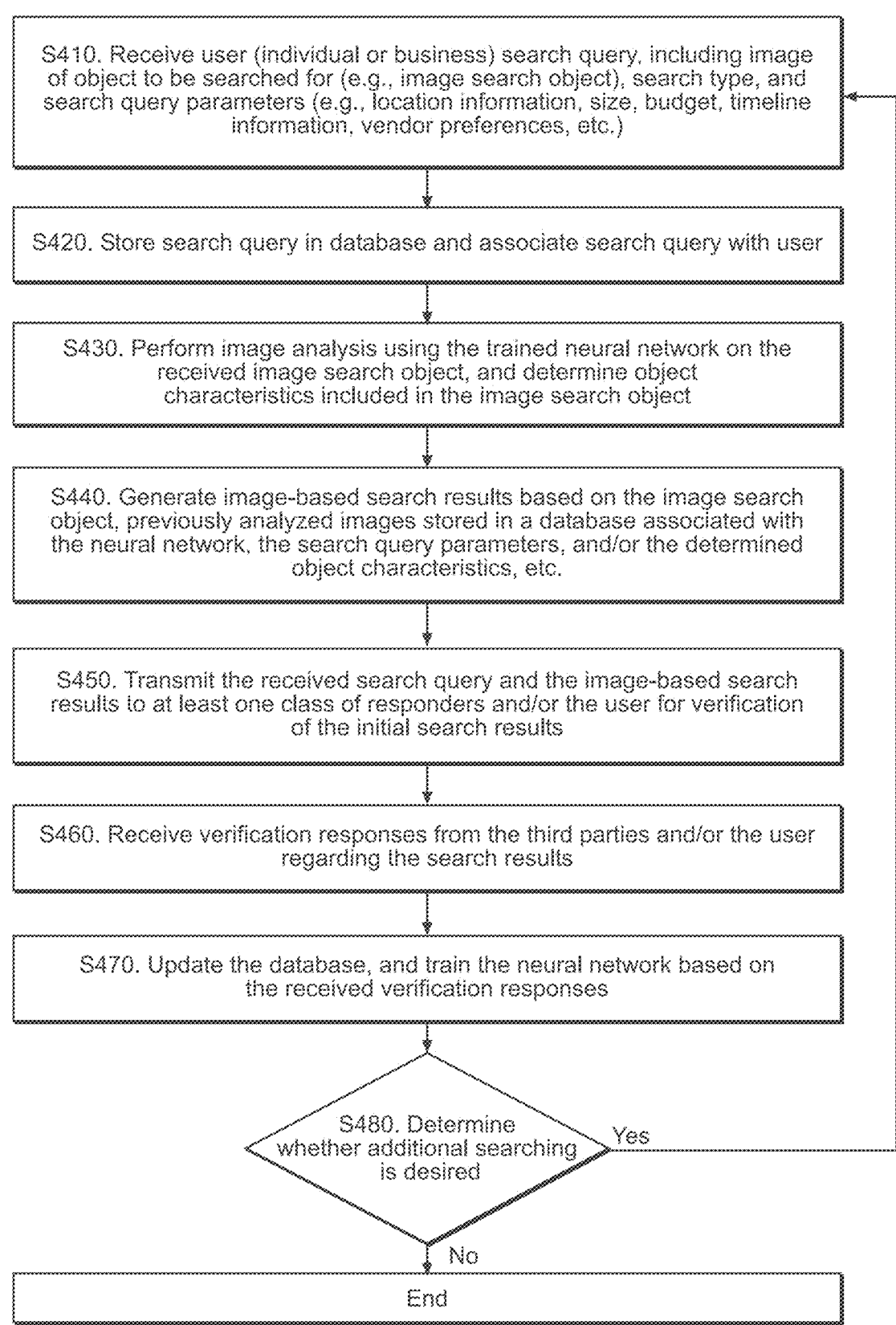

S410. Receive user (individual or business) search query, including image of object to be searched for (e.g., image search object), search type, and search query parameters (e.g., location information, size, budget, timeline information, vendor preferences, etc.)

S420. Store search query in database and associate search query with user

S430. Perform image analysis using the trained neural network on the received image search object, and determine object characteristics included in the image search object S440. Generate image-based search results based on the image search object, previously analyzed images stored in a database associated with the neural network, the search query parameters, and/or the determined object characteristics, etc.

S450. Transmit the received search query and the image-based search results to at least one class of responders and/or the user for verification of the initial search results S460. Receive verification responses from the third parties and/or the user regarding the search results S470. Update the database, and train the neural network based on the received verification responses S480. Determine whether additional searching is desired Yes No End

FIG. 4

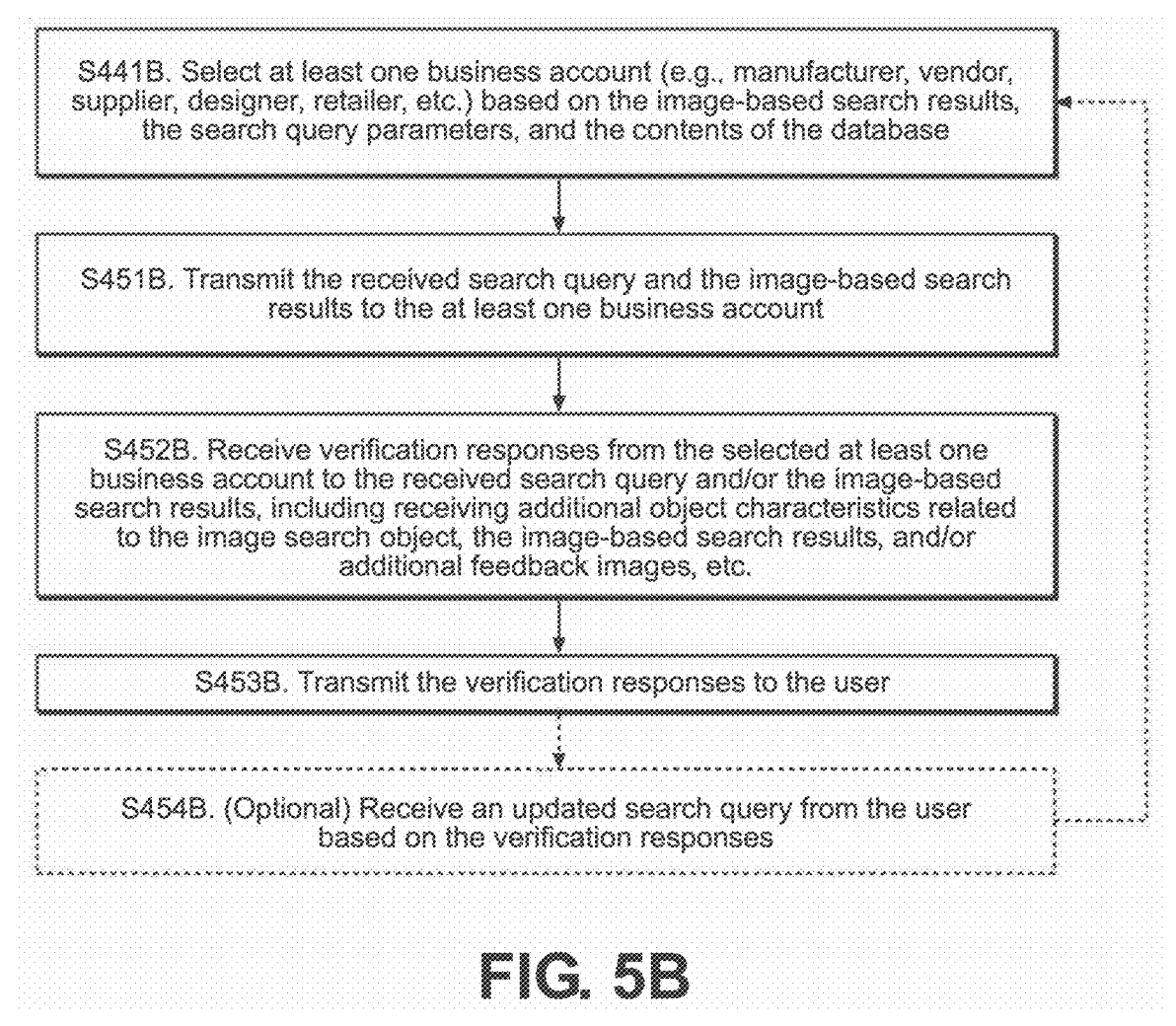

S441B. Select at least one business account (e.g., manufacturer, vendor, supplier, designer, retailer, etc.) based on the image-based search results, the search query parameters, and the contents of the database S451B. Transmit the received search query and the image-based search results to the at least one business account S452B. Receive verification responses from the selected at least one business account to the received search query and/or the image-based search results, including receiving additional object characteristics related to the image search object, the image-based search results, and/or additional feedback images, etc.

S453B. Transmit the verification responses to the user

S454B. (Optional) Receive an updated search query from the user based on the verification responses

FIG. 5B

METHOD, APPARATUS, SYSTEM, AND NON-TRANSITORY COMPUTER READABLE MEDIUM FOR PERFORMING IMAGE SEARCH VERIFICATION USING AN ONLINE PLATFORM

CROSS-REFERENCE TO RELATED APPLICATION

This application is a continuation of U.S. application Ser. No. 17/220,464, filed on Apr. 1, 2021, the entire disclosure of which is incorporated herein by reference.

BACKGROUND

Field

Various example embodiments relate to methods, apparatuses, systems, and/or non-transitory computer readable media for performing image searches using an online platform, and more particularly, methods, apparatuses, systems, and/or non-transitory computer readable media for verifying search results for image searches generated using a neural network associated with the online platform and training the neural network based on the search result verification.

Description of the Related Art

Various online platforms, websites, social networking services, and/or search engines exist which allow users to perform text searches and/or post text messages to online communities asking questions regarding a topic. Additionally, search engines may allow users to upload images and/or photos of an object and to perform a search regarding the object, such as a reverse image search. However, conventional reverse image search engines typically rely on metadata embedded within an image, such as resource locator information (e.g., URLs, etc.), creator information, keywords, tags, descriptions, copyright information, etc. While some metadata may be automatically generated by the hardware used to generate the image at the time that the image is created and/or are generated by software at the time that the image is modified, often times the metadata or relevant portions of the metadata is manually entered by the content creator, which may be tedious, inefficient, time-consuming and/or result in impractical consumption of resources. Additionally, if the image has been copied by other users and/or modified by other users, the metadata may be changed and/or removed from the original image. Accordingly, useful and/or relevant metadata associated with the image may be missing and/or incorrect, and therefore the accuracy of the reverse image search services may be degraded and/or the search results associated with the image search may be irrelevant and/or dissimilar to the search query.

Other reverse image search engines may further include limited analysis of objects included in the image to generate additional metadata for the image for use in image searching, such as analyzing shapes, colors, and text included in the image. However, the accuracy of the generated metadata may be less than desired and/or required due to lack of manual verification of the generated metadata.

Accordingly, an approach is desired that provides improved image searching for users based on verification of the search results provided by an image-based search service using a trained neural network. Additionally, there is a desire for an improved image searching system which allows a community of users to easily verify the accuracy of search results provided in relation to a user submitted image search, as well as allowing the community of users to provide additional and/or update metadata associated with the image search, thereby improving the training of the neural network based on the responses of the community of users.

SUMMARY

At least some example embodiments relates to a server for an online platform.

In at least one example embodiment, the server may include a memory storing computer readable instructions and a database corresponding to a neural network associated with the online platform, and processing circuitry which may be configured to execute the computer readable instructions to cause the server to receive an image-based search query from a first user device, the image-based search query including at least one image including a search object, and search query parameters related to the search object, analyze the search object using the neural network to determine an object type of the search object and at least one object type specific characteristic of the search object, the analyzing the search object using the neural network including determining scalar values for each determined object type specific characteristic based on analysis of the search object, and generating a unique numeric sequence for the search object based on the scalar values, provide the image-based search query, the determined object type, the determined at least one object type specific characteristic, and the unique numeric sequence of the search object to at least one second user device, and receive at least one search result response from the at least one second user device.

Some example embodiments provide that the server may further be caused to transmit the at least one search result response to the first user device, receive a confirmation response from the first user device, and train the neural network using natural language processing based on the received at least one search result response and the confirmation response.

Some example embodiments provide that the server may further be caused to perform the analysis of the search object using the neural network by performing image pre-processing of the at least one search image using the neural network, determining general object characteristics of the search object based on results of the image pre-processing using the neural network, determining an object type of the search object based on the determined general object characteristics using the neural network, selecting a set of object-specific image analysis neurons of the neural network based on the determined object type of the search object, and determining the scalar values of each of the object type specific characteristics of the search object using the selected set of object-specific image analysis neurons.

Some example embodiments provide that the determined object type may be a dress, and the selected set of object type specific characteristic may include at least one neuron configured to analyze the search image to determine a scalar value corresponding to at least one of a color family of the search object, a silhouette of the search object, a sleeve length of the search object, a lace pattern of the search object, a fabric of the search object, a lace position of the search object, a back design of the search object, a design features of the search object, a train style of the search object, or any combinations thereof.

Some example embodiments provide that the server may further be caused to select, using the neural network, the at least one second user device from a plurality of second user devices associated with the online platform based on the unique numeric sequence of the search object and information related to the plurality of second user devices, and provide the at least one image, the search query parameters, the determined object type of the search object, the scalar values of each determined at least one object type specific characteristic of the search object, and the unique numeric sequence of the search object to the determined at least one second user device.

Some example embodiments provide that the server may further be caused to select at least one user device associated with at least one business account as the at least one second user device based on the determined object type of the search object, the unique numeric sequence of the search object, information associated with the at least one business account stored in the database, the scalar values of each determined at least one object type specific characteristic of the search object, and the search query parameters, provide the image-based search query, the determined object type, the determined at least one object type specific characteristics, and the unique numeric sequence of the search object to the selected at least one second user device, and receive the search result response from the at least one business account.

Some example embodiments provide that the information associated with the at least one business account may include real-time inventory information associated with the at least business account, and the server may be further caused to select the at least one business account based on the real-time inventory information associated with the at least one business account, the determined object type, the determined at least one object type specific characteristics, the unique numeric sequence of the search object, and the search query parameters.

Some example embodiments provide that the server may further be caused to select at least one user device associated with at least one personal account as the at least one second user device based on information associated with the at least one personal account stored in a database, the determined object type, the determined at least one object type specific characteristics, the unique numeric sequence of the search object, and the search query parameters, provide the image-based search query, the determined object type, the determined at least one object type specific characteristics, and the unique numeric sequence of the search object to the selected at least one second user device, and receive the search result response from the at least one personal account.

Some example embodiments provide that the information associated with the at least one personal account may include history information associated with the at least one personal account, and the server maybe further caused to select the at least one personal account based on the history information associated with the at least one personal account, the determined object type, the determined at least one object type specific characteristics, the unique numeric sequence of the search object, and the search query parameters.

Some example embodiments provide that the search result response may include at least one of product information corresponding to the search object, at least one search result image associated with the search object, manufacturer information corresponding to the search object, vendor information corresponding to the search object, inventory status information corresponding to the search object, similarity information corresponding to the search object, vendor location information related to the search object, manufacturing capability information related to the search object, or any combinations thereof.

Some example embodiments provide that the server may further be caused to provide the image-based search query and the determined object characteristics of the at least one image search object to the at least one second user device by publishing the search query and the determined object characteristics in a forum related to the online platform.

At least some example embodiments relates to a non-transitory computer readable medium.

In at least one example embodiment, the non-transitory computer readable medium may include computer executable instructions, which when executed by processing circuitry of at least one server associated with an online platform, may cause the at least one server to receive an image-based search query from a first user device, the image-based search query including at least one image including a search object, and search query parameters related to the search object, analyze the search object using a neural network associated with the online platform to determine an object type of the search object and at least one object type specific characteristic of the search object, the analyzing the search object using the neural network including determining scalar values for each determined type specific characteristic based on analysis of the search object, and generating a unique numeric sequence for the search object based on the scalar values, provide the image-based search query, the determined object type, the determined at least one object type specific characteristics, and the unique numeric sequence of the search object to at least one second user device, and receive at least one search result response from the at least one second user device.

Some example embodiments provide that the at least one server may be further caused to transmit the at least one search result response to the first user device, receive a confirmation response from the first user device, and train the neural network using natural language processing based on the received at least one search result response and the confirmation response.

Some example embodiments provide that the at least one server may be further caused to perform image pre-processing of the at least one search image using the neural network, determine general object characteristics of the search object based on results of the image pre-processing using the neural network, determine an object type of the search object based on the determined general object characteristics using the neural network, select a set of object-specific image analysis neurons of the neural network based on the determined object type of the search object, and determine the scalar values of each of the object type specific characteristics of the search object using the selected set of object-specific image analysis neurons.

Some example embodiments provide that the determined object type may be a dress, and the selected set of object type specific characteristic may include at least one neuron configured to analyze the search image to determine a scalar value corresponding to at least one of a color family of the search object, a silhouette of the search object, a sleeve length of the search object, a lace pattern of the search object, a fabric of the search object, a lace position of the search object, a back design of the search object, a design features of the search object, a train style of the search object, or any combinations thereof.

Some example embodiments provide that the at least one server may be further caused to select, using the neural network, the at least one second user device from a plurality of second user devices associated with the online platform based on the unique numeric sequence of the search object and information related to the plurality of second user devices, and provide the at least one image, the search query parameters, the determined object type of the search object, the scalar values of each determined at least one object type specific characteristic of the search object, and the unique numeric sequence of the search object to the determined at least one second user device.

Some example embodiments provide that the at least one server may be further caused to select at least one user device associated with at least one business account as the at least one second user device based on the determined object type of the search object, the unique numeric sequence of the search object, information associated with the at least one business account stored in the database, the scalar values of each determined at least one object type specific characteristic of the search object, and the search query parameters, provide the image-based search query, the determined object type, the determined at least one object type specific characteristics, and the unique numeric sequence of the search object to the selected at least one second user device, and receive the search result response from the at least one business account.

Some example embodiments provide that the information associated with the at least one business account may include real-time inventory information associated with the at least business account, and the server may be further caused to select the at least one business account based on the real-time inventory information associated with the at least one business account, the determined object type, the determined at least one object type specific characteristics, the unique numeric sequence of the search object, and the search query parameters.

Some example embodiments provide that the at least one server may be further caused to select at least one user device associated with at least one personal account as the at least one second user device based on information associated with the at least one personal account stored in a database, the determined object type, the determined at least one object type specific characteristics, the unique numeric sequence of the search object, and the search query parameters, provide the image-based search query, the determined object type, the determined at least one object type specific characteristics, and the unique numeric sequence of the search object to the selected at least one second user device, and receive the search result response from the at least one personal account.

At least some example embodiments relates to a user device associated with an online platform.

In at least one example embodiment, the user device may include a memory storing computer readable instructions, and processing circuitry which may be configured to execute the computer readable instructions to cause the user device to receive an image-based search query from a first user via a graphical user interface (GUI) associated with the online platform, the image-based search query including at least one image including a search object, and search query parameters related to the search object, transmit the image-based search query to at least one server associated with the online platform, receive at least one search result response from the at least one server, receive a confirmation response from the first user via the GUI, the confirmation response including similarity information regarding the at least one search result response and the image-based search query, and transmit the confirmation response to the at least one server, the confirmation response causing the at least one server to train a neural network associated with the online platform using natural language processing based on the at least one search result response and the confirmation response.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 4 illustrates a method for performing an image-based search according to at least one example embodiment;

FIGS. 5A to 5B illustrate some methods for receiving verification feedback of an image-based search according to some example embodiments;

DETAILED DESCRIPTION

Figure 1:
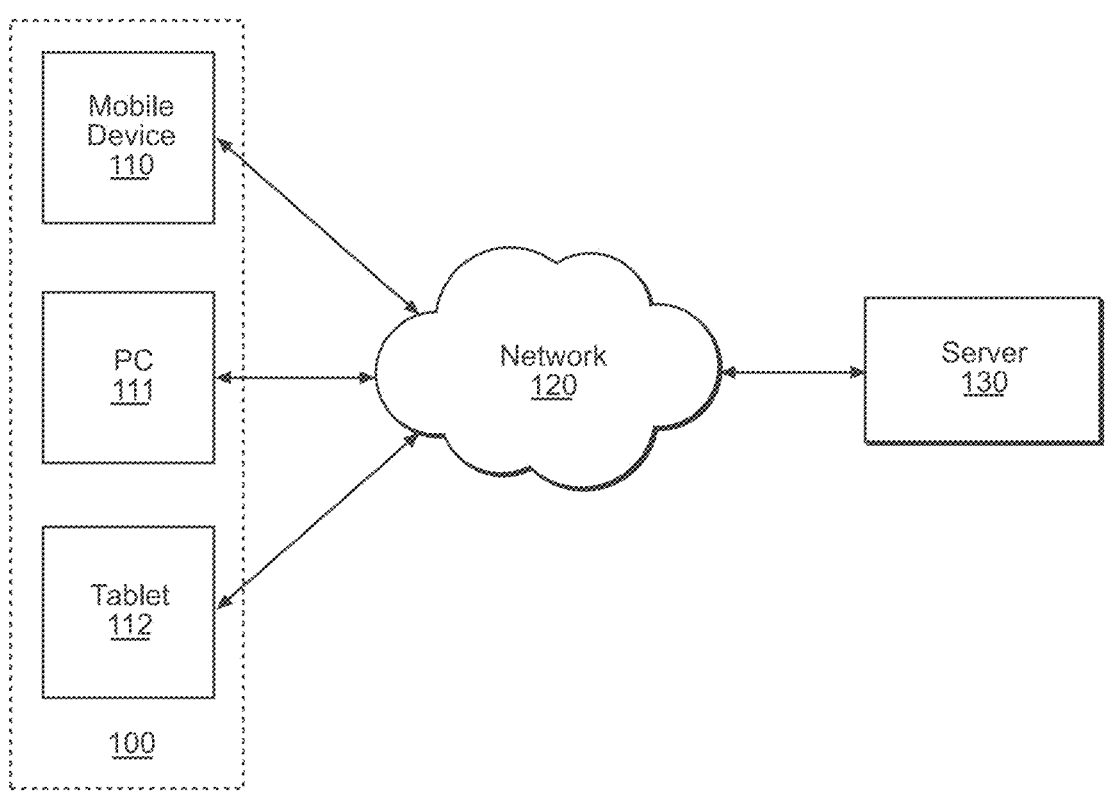
FIG. 1 illustrates a system associated with an online platform according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods performing image searches using an online platform. While the various example embodiments of the present disclosure are discussed in connection with the an online platform for the sake of clarity and convenience, the example embodiments are not limited thereto, and one of ordinary skill in the art would recognize the example embodiments may be applicable to other online and/or mobile services, such as a website, a web portal, a social networking service (SNS), a forum, an instant messaging service, a chat service, a search engine, an e-commerce platform, etc.

FIG. 1 illustrates a system associated with an online platform according to at least one example embodiment. As shown in FIG. 1, the online platform system includes a plurality of user devices 100 including a mobile device 110, a personal computer 111, and a tablet 112, etc., a network 120, and at least one server 130 associated with the online platform, but the example embodiments are not limited thereto and the example embodiments may include a greater or lesser number of constituent elements. According to at least one example embodiment, the server 130 may host and/or provide functionality of at least a portion of the online platform, etc., and each of the plurality of user devices 100 may allow a respective user to access the online platform via the server 130. For example, the system may include a plurality of servers associated with (and/or hosting, implementing, etc.) the online platform, the system may include less than three user devices, the system may include greater than three user devices, etc.

The plurality of user devices 100 and the server 130 may be connected over the network 120, and the network 120 may correspond to a wireless network, such as a cellular wireless access network (e.g., a 3G wireless access network, a 4G-Long Term Evolution (LTE) network, a 5G-New Radio (e.g., 5G) wireless network, a WiFi network, a satellite network, etc.) and/or a wired network (e.g., a fiber network, a cable network, a PTSN, etc.). The server 130 may connect to other servers (not shown), over a wired and/or wireless network, and each of the user devices 110, 111, and/or 112 may connect to other user devices over a wired and/or wireless network. The network 120 may refer to the Internet, an intranet, a wide area network, etc.

While certain components of a system associated with an online platform are shown in FIG. 1, the example embodiments are not limited thereto, and the system may include components other than that shown in FIG. 1, which are desired, necessary, and/or beneficial for operation of the underlying networks within the system, such as base stations, access points, switches, routers, nodes, servers, gateways, etc.

Figure 2:
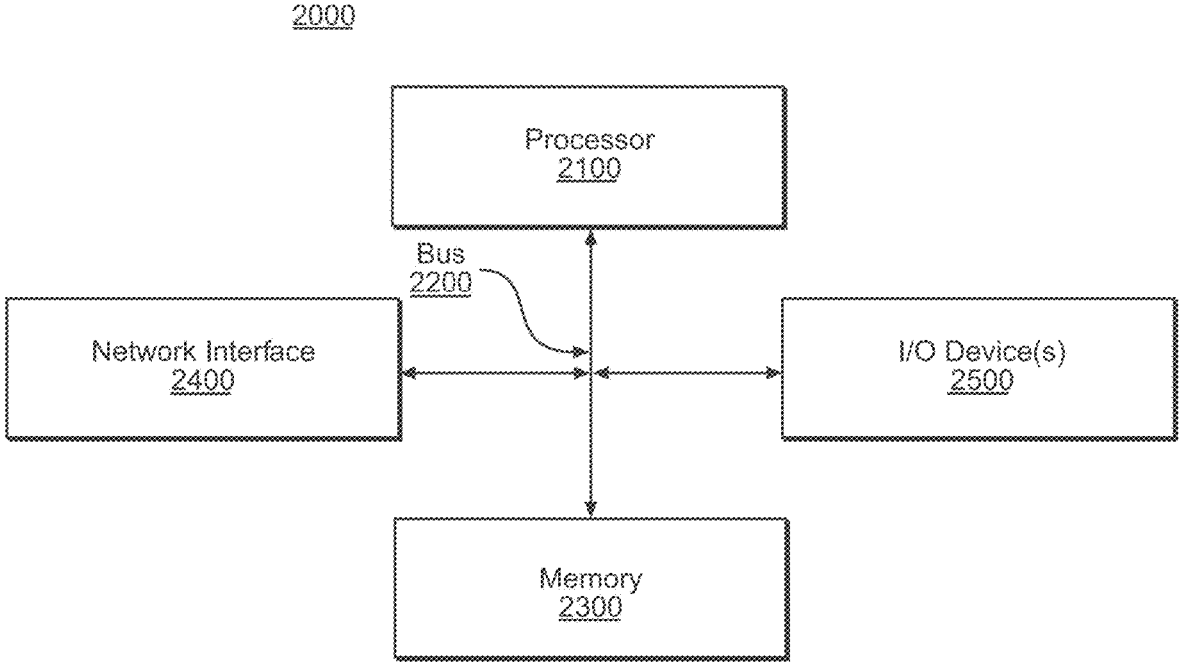
FIG. 2 illustrates a block diagram of an example server of the online platform according to at least one example embodiment.

FIG. 2 illustrates a block diagram of an example server of the online platform according to at least one example embodiment. The server 2000 of FIG. 2 may correspond to the server 130 of FIG. 1, but the example embodiments are not limited thereto.

Referring to FIG. 2, a server 2000 may include processing circuitry, such as the at least one processor 2100, at least one communication bus 2200, a memory 2300, at least one network interface 2400, and/or at least one input/output (I/O) device 2500 (e.g., a keyboard, a touchscreen, a mouse, a microphone, a camera, a speaker, etc.), etc., but the example embodiments are not limited thereto. For example, the server 2000 may further include a display panel (not shown), such as a monitor, a touchscreen, etc. The memory 2300 may include various special purpose program code including computer executable instructions which may cause the server 2000 to perform the one or more of the methods of the example embodiments, including but not limited to computer executable instructions related to an image searching service, a trained neural network for performing the image searching service, an image database associated with the image searching service and/or the trained neural network, etc.

In at least one example embodiment, the processing circuitry may include at least one processor (and/or processor cores, distributed processors, networked processors, etc.), such as the at least one processor 2100, which may be configured to control one or more elements of the server 2000, and thereby cause the server 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire server 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the online platform (e.g., the image searching service, an image database associated with the image searching service and/or the trained neural network, etc.) and/or the server 2000, such as the methods discussed in connection with FIGS. 4 to 6B, the at least one network interface 2400, and/or at least one I/O device 2500, etc. Such software elements may be loaded from a non-transitory computer-readable storage medium independent of the memory 2300, using a drive mechanism (not shown) connected to the server 2000, or via the at least one network interface 2400, and/or at least one I/O device 2500, etc.

In at least one example embodiment, the at least one communication bus 2200 may enable communication and/or data transmission to be performed between elements of the server 2000. The bus 2200 may be implemented using a high-speed serial bus, a parallel bus, and/or any other appropriate communication technology. According to some example embodiments, the server 2000 may include a plurality of communication buses (not shown).

The server 2000 is associated with an online platform and may operate as, for example, a web server, a messaging server, search server, etc., and may be configured to provide image search services to at least one user of the online platform. Additionally, the server 2000 may also provide communication and/or messaging services for the one or more users of the online platform which allows users of the online platform to contact and/or message one or more other users of the online platform via the server 2000. For example, the server 2000 may also provide an online community (e.g., a forum, a website, a shopping portal, a discussion board, a group chat service, a teleconference service, a videoconference service, etc.) wherein users of the online platform may post messages for viewing by all of the other users of the online platform, or a subset of the users of the online platform. Moreover, the online platform may provide one or more sections dedicated to different categories (e.g., topics, etc.) of interest to the users.

According to at least one example embodiment, the server 2000 may host a website associated with an image search service of the online platform. The image search service may be dedicated to a particular category (e.g., such as a product search, a service search, a person search, an information search, a video search, etc.), but the example embodiments are not limited thereto, and the image search service may be a general purpose search service. The image search service may allow a user to upload an image of an object to be searched for (e.g., a search object, etc.), as well as search parameters associated with the user's search query. For example, the user may perform an image-based search related to a person, an animal, a video, a product, a good, a service, etc., by uploading an image including a search object. Optionally, the user may further input the search parameters related to the user's search query and/or related to the search object, such as known information of the search object and/or information about the search object that the user desires to learn more about. The methods for performing the image searching according to some example embodiments will be discussed in further detail in connection with FIGS. 4 to 6B.

According to some example embodiments, the server 2000 may analyze the search image and generate search results responsive to the search query using a trained neural network executed by the server 2000 and/or executed on at least one other server, etc. According to other example embodiments, the server 2000 may omit the use of the neural network and may perform the image search using pattern recognition algorithms and/or image matching algorithms using the search image and images stored in a database (e.g., the comparison images, etc.) included in the memory 2300 of the server 2000, however the example embodiments are not limited thereto and other image analysis techniques may be used as well, such as text extraction, etc. The image searching performed by the server 2000 may further include filtering the comparison images by comparing the metadata and/or tags associated with the each of the comparison images with the search parameters included in the user's search query and/or the additional information provided by the user.

While FIG. 2 depicts an example embodiment of a server 2000, the server 2000 is not limited thereto, and may include additional and/or alternative architectures that may be suitable for the purposes demonstrated. For example, the functionality of the server 2000 may be divided among a plurality of physical, logical, and/or virtual server and/or computing devices, network elements, etc., but the example embodiments are not limited thereto.

Figure 3:
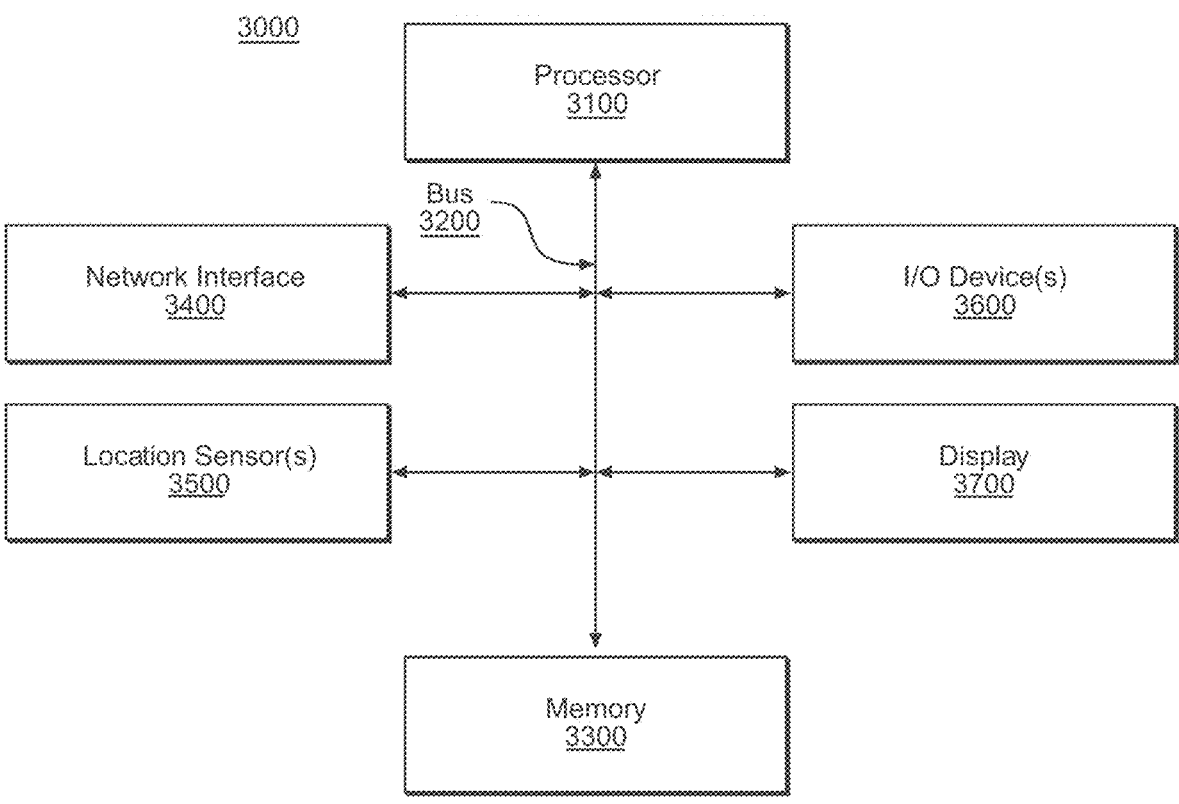
FIG. 3 illustrates a block diagram of an example user device according to at least one example embodiment.

FIG. 3 illustrates a block diagram of an example user device according to at least one example embodiment. The example user device 3000 of FIG. 3 may correspond to one or more of the plurality of user devices 100 of FIG. 1, but the example embodiments are not limited thereto. According to at least one example embodiment, the user device 3000 of FIG. 3 may be a computing device, such as a personal computer (PC), a laptop, a database, a server, a smartphone, a tablet, any other smart devices, a wearable device, an Internet-of-Things (IoT) device, a virtual reality (VR) and/or augmented reality (AR) device, a virtual assistant device, a gaming console, a Personal Digital Assistant (PDA), etc., but the example embodiments are not limited thereto.

Referring to FIG. 3, a user device 3000 may include processing circuitry, such as the at least one processor 3100, a communication bus 3200, a memory 3300, at least one network interface 3400, at least one location sensor 3500, at least one input/output (I/O) device 3600 (e.g., a keyboard, a touchscreen, a mouse, a microphone, a camera, a speaker, a haptic feedback device, etc.), and/or a display panel 3700 (e.g., a monitor, a touchscreen, a VR display, an AR display, etc.), etc. However, the example embodiments are not limited thereto, and the user device 3000 may include a greater or lesser number of constituent components. For example, the user device 3000 may also include a battery, at least one wireless antenna, one or more additional sensors (e.g., thermometers, humidity sensors, pressure sensors, motion sensors, accelerometers, etc.), actuators, etc. Additionally, the location sensor 3500, the display panel 3700, and/or I/O device 3600, etc., of user device 3000 may be optional.

In at least one example embodiment, the processing circuitry may include at least one processor (and/or processor cores, distributed processors, networked processors, etc.), such as the at least one processor 3100, which may be configured to control one or more elements of the user device 3000, and thereby cause the user device 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire user device 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the user device 3000, such as the methods discussed in connection with FIGS. 4 to 6B, the network interface 3400, and/or the location sensor 3500, etc. Such software elements may be loaded from a non-transitory computer-readable storage medium independent of the memory 3300, using a drive mechanism (not shown) connected to the user device 3000, or via the network interface 3400, etc. Additionally, the memory 3300 may store network configuration information, such as system information, security information (e.g., passwords, tokens, etc.), etc., for communicating with the online platform, the server 130 and/or the server 2000, etc., accessing a wireless network, accessing a wired network, but the example embodiments are not limited thereto.

For example, a user associated with the user device 3000 may access services and/or functionality provided by the online platform, such as image-based searching, messaging services allowing the user to communicate with other users registered with the online platform and/or businesses and/or organizations registered with the online platform, browse and/or post messages on online community services corresponding to one or more categories, topics of interest, etc., via the network 120 and the server 130. For example, the GUI may be a part of a software program (e.g., an app, etc.) corresponding to the online platform installed in the memory 3300 of the user device 3000, the GUI may be included in a website corresponding to the online platform and accessed using a web browser installed in the memory 3300 of the user device 3000 corresponding to the online platform, etc., but the example embodiments are not limited thereto.

According to at least one example embodiment, the user may input at least one search query for the online platform using a GUI associated with the online platform displayed on the user device 3000. The search user may access the online platform using the user device 3000 and upload at least one search image related to his or her search query, input text related to their search query, such as search parameters for the search query, and/or input additional information regarding the object of the search query, etc. The user device 3000 of the search user may receive search results in response to their search query from the server 130 of the online platform, and may provide a verification and/or confirmation response with respect to the received search results, but the example embodiments are not limited thereto.

Additionally, at least one second user using their respective user device 3000, such as a personal user or a business user, etc., may receive the search query input by the search user, including the search image, the search parameters, and/or the additional information, etc. According to some example embodiments, the second user (e.g., a responding user, etc.) may input a response to the search query, such as additional information related to the object included in the search image, upload additional images corresponding to the search object, input a private message for the search user, indicate an interest in the search query, etc. The second user may further provide inputs related to the relevance, similarity, and/or accuracy of the initial search results generated by the neural network and/or server 130, as well as provide inputs regarding the characteristics of the search object generated by the neural network and/or the server 130, etc., such as the general object characteristics of the search image, the object type of the search image, the object type specific characteristics of the search image, etc., but the example embodiments are not limited thereto. These features will be discussed in greater detail in connection with FIGS. 4 to 7E.

Referring again to FIG. 3, in at least one example embodiment, the at least one communication bus 3200 may enable communication and/or data transmission to be performed between elements of the user device 3000. The bus 3200 may be implemented using a high-speed serial bus, a parallel bus, and/or any other appropriate communication technology. According to some example embodiments, the user device 3000 may include a plurality of communication buses (not shown).

The user device 3000 may also include at least one network interface 3400. The network interface 3400 may include an associated radio unit (not shown) and may be used to transmit wireless signals in accordance with at least one desired radio access technology, such as 4G LTE, 5G NR, Wi-Fi, Bluetooth, NFC, etc. According to some example embodiments, the network interface 3400 may be a wired communication interface, such as an Ethernet interface, a USB interface, a coaxial interface, etc., but is not limited thereto The user device 3000 may also include at least one location sensor 3500 to calculate the absolute and/or relative location of the user device 3000. The at least one location sensor 3500 may be a GNSS sensor, such as a GPS sensor, a GLONASS sensor, a Galileo sensor, a Beidou sensor, etc., and/or may be an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the user device 3000. However, the example embodiments are not limited thereto, and the at least one location sensor 3500 may be a different type of location sensor, or may be omitted from the user device 3000.

While FIG. 3 depicts an example embodiment of a user device 3000, the user device is not limited thereto, and may include additional and/or alternative architectures that may be suitable for the purposes demonstrated.

FIG. 4 illustrates a method for performing an image-based search according to at least one example embodiment.

Referring now to FIG. 4, in at least one example embodiment, in operation S410 a user (e.g., a search user, etc.) may perform an image-based search related to an item, a product (e.g., an item of apparel, such as a wedding dress, a piece of jewelry, shoes, etc.), a piece of artwork, a portrait or photo of a person, a video clip from a movie or show, a logo related to a service provider, a design and/or schematic, a document, an image of a building, an image of a geographical location (e.g., landscape, vacation destination, etc.), etc., but the example embodiments are not limited thereto.

For example, the user may request information regarding a wedding dress image that they are interested in, but does not know the name of the wedding dress, the designer of the wedding dress, a retailer who sells the wedding dress, etc. The user may upload an image of the wedding dress to the online platform using a GUI associated with the online platform via the server 130, and may further input search parameters related to the wedding dress, such as a size of the dress that the user desires, a desired price range, a geographic location of the user and/or geographical limitation information restricting the geographical area to search, a desired color for the wedding dress, a request for information of retailers who supply the wedding dress, a request for information related to the cost of the wedding dress, a request for further information related to the fabrics and/or materials used to make the wedding dress, a request for further information related to a place of manufacture for the wedding dress, etc., or any combinations thereof, but the example embodiments are not limited thereto.

Further, the user may input additional information (and/or partial information) known by the user about the wedding dress, such as the style of the dress, the manufacturer, the designer, the collection, etc., but the example embodiments are not limited thereto. According to some example embodiments, the user may further input a desired search type for the search query (e.g., search using a desired database associated with a desired category of information, search using the online platform community, and/or search using registered businesses, designers, retailers, manufacturers, vendors, suppliers, distributors, creators, sources, etc.). Additionally, according to some example embodiments, the user may specify that they are looking an "exact match" (e.g., an identical match, the same object as the object shown in the search image, etc.) for the search object as the search type, and/or may specify that they are searching for a "similar match" to the search object as the search type, thereby indicating that a non-exact match is acceptable, etc. Additionally, according to some example embodiments, if the user specifies that a "similar match" to the search object is acceptable, the user may further specify a numerical range indicating a range of similarity to the search object that would be acceptable to the user, as well as specifying a rank and/or weight to be given to different characteristics of the search object which may be used to calculate the similarity score of search results to the search object. For example, the user may specify that a size of the dress and a location of a vendor is of higher importance to the user than the manufacturer of the dress or the material of the dress, etc.

Figure 7A:
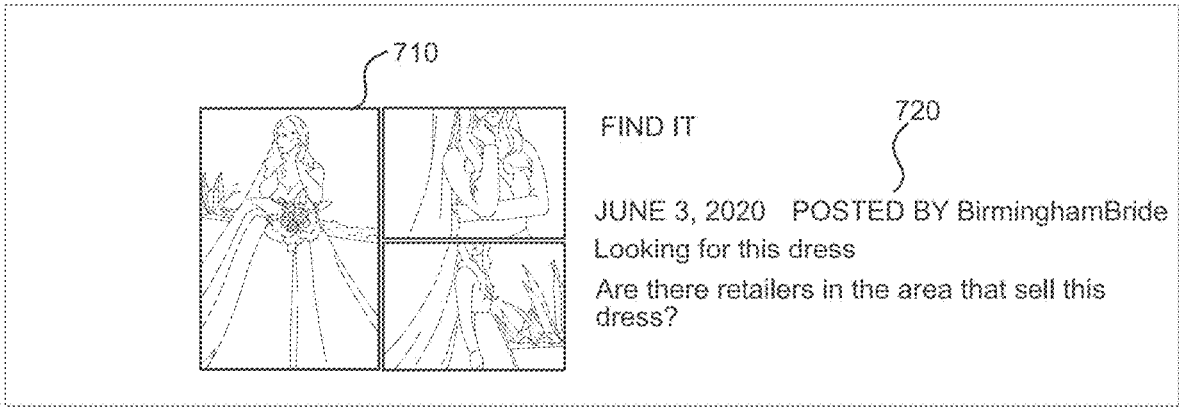
FIGS. 7A to 7E illustrate example graphical user interfaces associated with an online platform according to some example embodiments.

Referring now to FIG. 7A which illustrates an example search query GUI associated with the online platform, the search user may upload images corresponding to the search query in a first section 710 of the search query GUI, and may input the search parameters and/or the additional information in a second section 720 of the search query GUI, but the example embodiments are not limited thereto.

In operation S420, the server 130 may receive the search query, including the image of the wedding dress (e.g., the search object), the search parameters, and/or the additional information input by the user from the user's corresponding user device (e.g., user devices 110, 111, 112, etc.), but the example embodiments are not limited thereto. For example, in the event that the user selects a "similar match" search type, the user may specify a desired threshold value and/or a desired similarity score which they will deem to be acceptable. Further, for the "similar match" search type, the user may specify an importance rating (e.g., a weight value, etc.) for one or more characteristics of the search object to determine the similarity score of a search result to the search object. With regards to the "exact match" type of search, importance ratings corresponding to a desired set of characteristics associated with the type of search object may be set by the server 130 to desired values based on experimental data, empirical data, and/or historical data (e.g., previous searches run on the same type of search object), etc., but the example embodiments are not limited thereto. For example, the user may specify the type of search object within the search parameters (e.g., an apparel search type, a wedding dress search type, a product search type, a person search type, etc.) and/or the neural network and/or the server 130 may analyze the image using image analysis algorithms and classify the search type of the object contained within the search image, but the example embodiments are not limited thereto. The server 130 may then store the search query in a database associated with the trained neural network of the online platform. The server 130 may also associate the search query with the user account of the search user, and store the search query, the search parameters, and/or the additional information received from the user as metadata associated with the search user. The method(s) of performing image analysis using a neural network will be discussed in greater detail in connection with FIGS. 6A to 6B.

In operation S430, once the server 130 receives the image of the search object, the server 130 performs image analysis of the search object using a trained neural network (e.g., an artificial intelligence, a machine learning model, etc., hereinafter collectively referred to as a neural network). The neural network will analyze the image to identify the one or more search objects included in the search image and/or plurality of search images submitted by the user (e.g., such as the portion of the image corresponding to the wedding dress, etc.), determine an object type of the identified search object, and extract characteristics (e.g., general object characteristics and object type specific characteristics) of the identified object(s) included in the image(s). For the wedding dress example, the neural network may analyze the search image to determine general object characteristics of any search objects included in the search image, such as a shape (e.g., silhouette, etc.) of the search object(s), a texture of the search object(s), edges of the search object(s), and/or a color of the search object(s), etc., but the example embodiments are not limited thereto. The neural network then uses the results of the determined general object characteristics of the search object to determine the search object type of the search image. Additionally, according to some example embodiments, if the user provides the search object type in the search parameters of the search query, this operation may be omitted by the neural network. Alternatively, the neural network may use the user provided search object type to verify that the neural network's determined search object type is correct and thereby update its own training using the user provided search object type included in the search parameters. The method(s) of performing image analysis using a neural network will be discussed in greater detail in connection with FIGS. 6A to 6B.

Once the neural network determines the object type, the neural network further determines scalar values associated with object type specific characteristics of the search object of the search image. In other words, once the neural network determines what type of object the search object is, the neural network will further analyze the image to determine characteristics specific to the search object type. For example, if the search object type included in the search image is a wedding dress, the neural network may then determine scalar values (e.g., numeric values within a desired numeric range, such as a 0-100, etc.) for the shape of the wedding dress, a silhouette of the wedding dress, a material type of the wedding dress, a neckline of the wedding dress, a sleeve length of the wedding dress, a lace position of the wedding dress, a dress length of the wedding dress, straps of the wedding dress, a back design of the wedding dress, a slit of the wedding dress, a belt/sash of the wedding dress, an overskirt of the wedding dress, a bow position of the wedding dress, a bow size of the wedding dress, a beading position of the wedding dress, a ruffle position of the wedding dress, a ruffle style of the wedding dress, a cutout/illusions of the wedding dress, a train length of the wedding dress, a train style of the wedding dress, a lace pattern of the wedding dress, a color family of the wedding dress, a fabric of the wedding dress, a beading style of the wedding dress, other miscellaneous design features of the wedding dress, etc., or any combinations thereof, but the example embodiments are not limited thereto. The determined scalar values of the object type specific characteristics and the search object type may be used to generate a unique numeric signature (e.g., a unique DNA signature) for the search object to be used in further image searches for the search object. However, the example embodiments are not limited thereto and the characteristics determined and/or extracted from the object contain within the search image may be based on the type of object being searched for and/or the classification of the search object determined by the neural network and/or server 130, etc. As another example, the search image submitted by the user may contain a manufactured product, packaging associated with a product, a person, an animal, a schematic for a product to be produced (e.g., a CAD file, a blueprint, a diagram, etc.), etc., and the set of characteristics determined for the object would change based on the classification of the search object of the search image. Additionally, the neural network and/or server 130 may extract text included in the search image using known optical character recognition algorithms and/or speech included in a search video using known speech recognition algorithms. The method(s) for performing the image analysis of the search image will be discussed in further detail in connection with FIGS. 6A to 6B.

Once the characteristics of the search object(s) have been extracted and/or determined from the search image, in operation S440, the neural network and/or the server 2000 may generate initial search results corresponding to the search query based on the classification of the search object (e.g., the search object type), the determined and/or extracted characteristics of the search object (e.g., the general and/or object type specific characteristics), the search parameters, and/or the additional information provided by the user in the search query, but the example embodiments are not limited thereto. For example, the neural network and/or the server 130 may compare the extracted characteristics to the DNA signature (e.g., the unique numeric sequence) of previously analyzed search objects, and/or metadata associated with images, stored in the database associated with the neural network to determine a match between the previously analyzed and/or previously stored images in the database and the search image based on the metadata. Additionally, the server 130 may associate at least one unique user account identifier with each determined DNA signature analyzed by the neural network to determine user accounts and/or business accounts who may be responsive and/or interested in the DNA signature in the future.

Additionally, the neural network and/or server 130 may access the database of the online platform to review metadata associated with a desired DNA signature, the metadata generated based on natural language processing performed by the neural network on information input to the online platform. For example, the neural network and/or the server 130 may perform natural language processing on uploaded information (e.g., a list of products and/or services offered by, designed by, manufactured, sold, distributed, repaired, serviced, etc., by a business, a user, etc.) related to business accounts registered with the online platform, profile information submitted by the business accounts, messaging history information of the business account, images of products offered by, designed by, manufactured, sold, distributed, repaired, serviced, etc., by a business, a user, etc., and/or the inventory databases (and/or real-time inventory) databases of business accounts that are connected to the online platform, through for example an application programming interface (API) associated with the online platform, etc., in order to further generate metadata associated the corresponding products and/or services. The generated metadata is then associated with the corresponding DNA signature in the database and may be used to select the relevant business accounts for the user submitted search query based on the matching of DNA signature of the search object and the DNA signature of products and/or services associated with the business account, etc., but the example embodiments are not limited thereto.

Additionally, the neural network and/or server 130 may analyze history information related to personal account users of the online platform by performing perform natural language processing on information, such as profile information of the personal account users (e.g., information regarding the user's interests, areas of expertise, geolocation information, employment information, education information, etc.), subscription information of the personal account users (e.g., website subscriptions, forum subscriptions, notification subscriptions, etc., associated with the user, etc.), contents of the personal account user's postings and/or messages on the online platform (e.g., messages posted onto the community section of the online platform, messages posted in chatrooms of the online platform, instant messages sent to other users, etc.), previous search queries submitted by the user, etc., to determine whether the personal account user is relevant, knowledgeable and/or has interest in the search object and/or the type of image search (e.g., search topic, etc.), but the example embodiments are not limited thereto. Referring again to the wedding dress example, the neural network may determine that one or more personal account users previously performed searches for the same wedding dress in the past based on a match of the DNA signature of the search object with the DNA signature of a previous search performed by the user, has discussed wedding dresses of the same type and/or made by the same designer, has recently bought a wedding dress from a retailer that carries the wedding dress from the same designer, etc., the user is a wedding planner and/or consultant, etc., but the example embodiments are not limited thereto. The neural network and/or server 130 may then select the personal account users who are determined to be relevant to the search object and/or the search type (and may be further restricted based on the geographic proximity to the search user), but the example embodiments are not limited thereto.

In operation S450, the neural network and/or server 130 may transmit a message to the selected business account(s) and/or to the selected personal account users. In some example embodiments, the server 130 may post the message in the relevant community section (e.g., forum, discussion board, chat group, messaging group, virtual conference, sub-section, etc.) of the online platform, etc. The transmitted message may include the search query submitted by the search user, the search image uploaded by the search user, the search parameters input by the user, the additional information input by the user, the characteristics determined by the neural network, and/or a list of initial search results generated by the neural network based on the contents of the neural network and/or online platform database, etc., but the example embodiments are not limited thereto.

In operation S460, the server 130 may receive responses (e.g., verification responses, search result responses, verification messages, etc.) from the selected business account users (e.g., a first type of user, a first category of user, a first class of user, etc.) and/or the selected personal account users (e.g., a second type of user, a second category of user, a second class of user, etc.). These responses may include additional information provided by the selected responding users to the search query, such as information regarding, for example, the designer of the wedding dress, the product name, the product line/collection information, price information for the wedding dress, additional images of the same wedding dress, etc. Additionally, if the respondent is a personal account user, the responding personal account user may indicate their own interest in the search object, thereby requesting for additional search results from the neural network and/or server 130 related to the search object, and/or may indicate that the selected personal account user desires to privately message the search user over the online platform instead of publicly posting their response, etc.

If the respondent is a business account user, the business account user may include information in the response indicating that the business account user is the designer for the search object, the manufacturer of the search object, is a retailer for the search object, etc., carries a similar product as the search object and provide information regarding the similar product, and/or may include further information related to the search object, such as additional images of the search object, price information of the search object, current availability and/or inventory status information for the search object, manufacturing capability for the search object, etc. Additionally, the business account user may indicate in the response that they would like to privately message the search user, set up a personal appointment and/or consultation session, etc., with the search user.

Moreover, the responses from either class of users may also include verification information and/or confirmation information regarding the initial search results generated by the neural network and/or the characteristics determined by the neural network. For example, the responding users may indicate that one or more of the initial search results are an exact match for the search object contained in the search query, are a similar match for the search object, and/or are not a match/irrelevant to the search query. For the "similar match" search type, the responding users may indicate a similarity score for one or more of the initial search results to the search object based on the set of characteristics associated with the search object classification. The additional information included in the verification responses may also be analyzed by the neural network and/or server 130 using natural language processing to generate additional metadata associated with the search object and/or DNA signature.

For example, the server 130 may generate the graphical user interface (GUI) for the responding users which presents the search query, the search image, the search parameters, the additional information provided by the search user, the determined characteristics generated by the neural network, and/or the initial search results generated by the neural network, etc., and may allow the responding users to input their response to the search query, provide additional information regarding the search object, upload additional images of the search object, and/or evaluate the relevance of the initial search results and/or evaluate the determined characteristics generated by the neural network. For example, the responding user may provide a similarity score for one or more of the initial search results, a relevance score of one or more of the determined characteristics for one or more of the initial search results, and/or indicate one or more of the initial search results are an exact match, are relevant, and/or are not relevant to the search query, etc., but the example embodiments are not limited thereto. Additionally, the responding user may input to one or more of the their responses as text, as an image, and/or using a user-manipulatable visual GUI element, such as a slider indicating a numerical value and/or a percentage for the similarity score, etc., icons, etc. In some example embodiments, the server 2000 may generate questions regarding the set of characteristics for the initial search results, and present the questions on the GUI, and the server 2000 may calculate the similarity score and/or relevance score based on the responding user responses to the generated questions, etc.

Figure 7B:
Figure 7C:
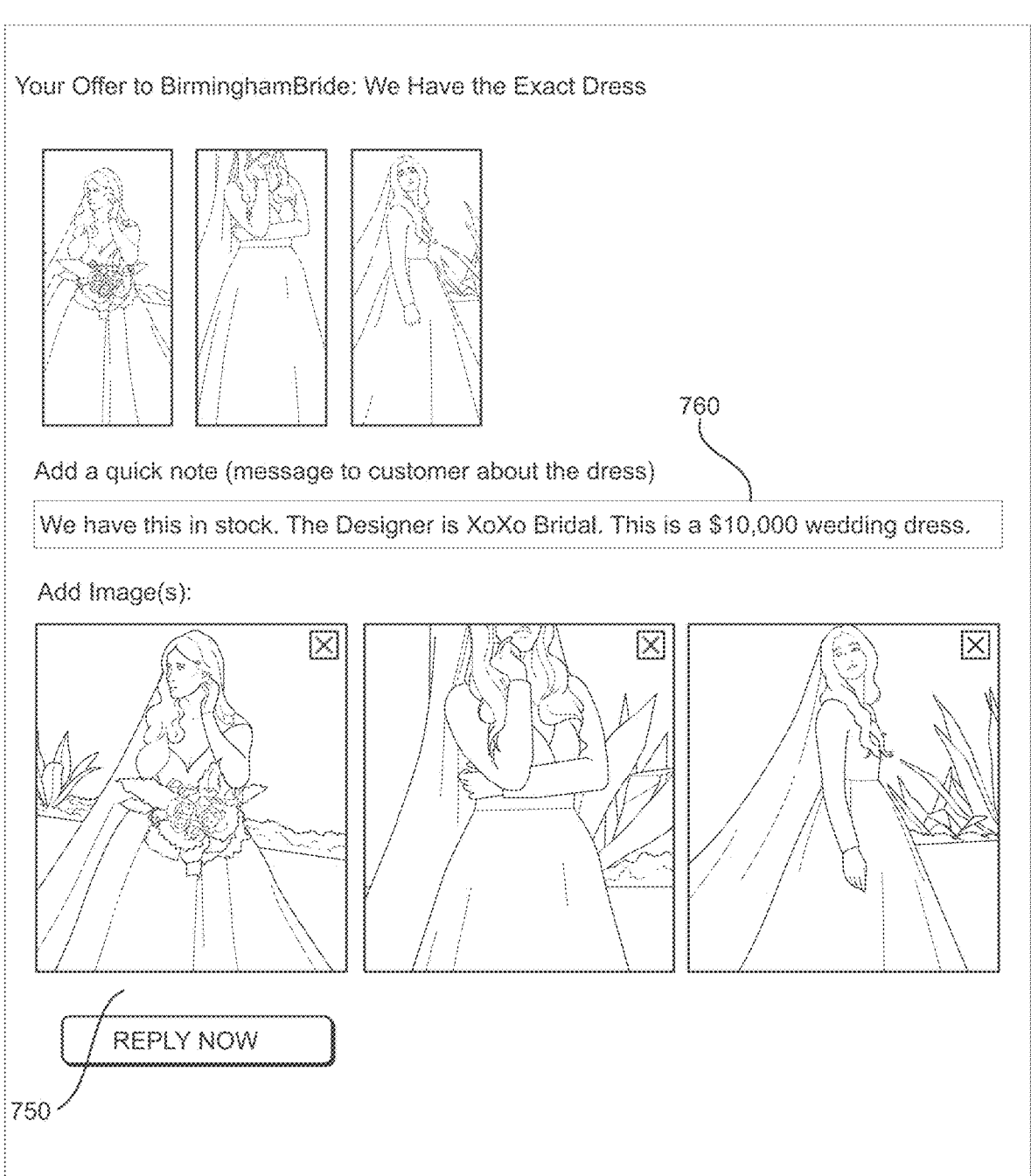
Figure 7D:
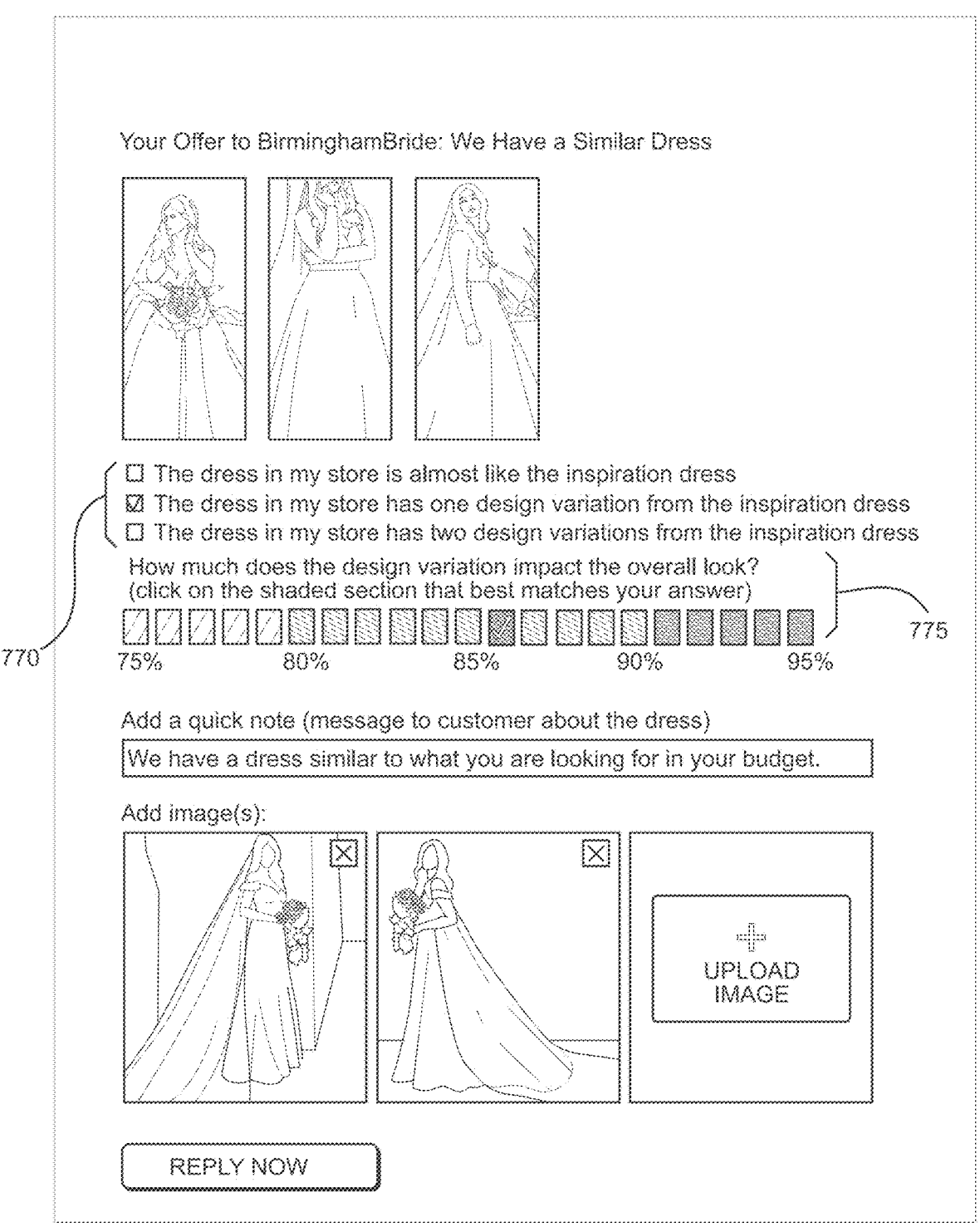

Referring to FIGS. 7B to 7D which illustrate example search result response GUIs associated with the online platform according to some example embodiments, the search response GUI of FIG. 7B may include at least a third section 730 and a fourth section 735 which display the search image(s) uploaded by the search user and the search parameters and/or the additional information included by the search user in the search query. Additionally, the search response GUI may further include a fifth section (not shown) which includes the determined characteristics generated by the neural network and/or server 130, or the determined characteristics may be displayed in the fourth section 735, etc. The responding user may initiate their response to the search query in a sixth section 740, but the example embodiments are not limited thereto.

Referring now to FIGS. 7C and 7D, the responding user may input their response to the search query by uploading additional responsive images into a seventh section 750, and may input a text response and/or message to the search user into an eighth section 760. Additionally, according to some example embodiments, the neural network and/or server 130 may generate and display questions regarding the initial search results and/or determined characteristics generated by the neural network and/or server 130 based on the type of search object and/or the type of search selected by the search user, in section 770, but the example embodiments are not limited thereto. Further, the search response GUI may also include one or more user-manipulatable visual GUI elements 775, such as a slider, check boxes, drop down menu, text input box, etc., which may be used by the search user to input their response to the search query, the initial search results, and/or the determined characteristics.

According to some example embodiments, the neural network and/or server 130 may update the search results by rearranging the listing of the initial search results based on the received responses, removing one or more irrelevant search results, and/or conducting another search based on the additional information submitted by the responding users, etc. These updated search results may be transmitted back to the responding users to repeat the verification process again, or may be transmitted directly to the search user.

The server 2000 may also transmit the initial search results (and/or the updated search results), the responses from the selected responding users, and/or the determined characteristics for the initial search results, etc., to the search user. The search user may be provided with a similar GUI as the responding users to allow the search user to confirm whether one or more of the initial search results are relevant to the user's search query, indicate the similarity score and/or relevance score of the initial search results, evaluate the determined characteristics of the initial search results, etc. However, the example embodiments are not limited thereto, and one or more of the verification operations may be omitted.

Figure 7E:
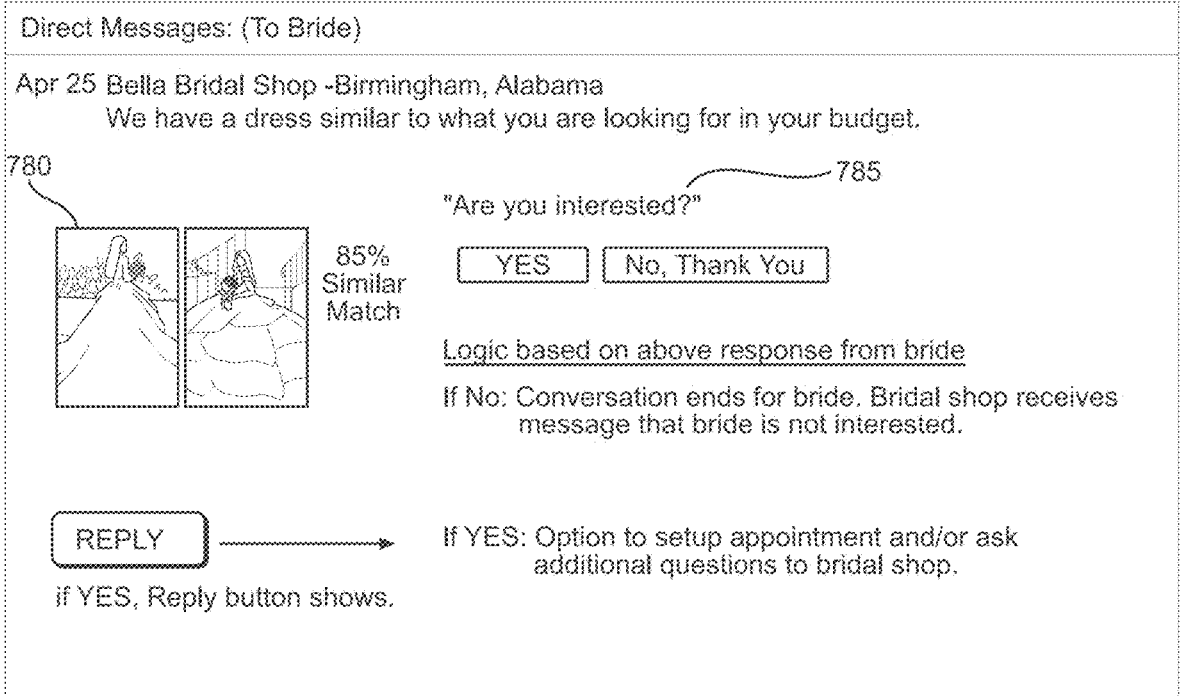

Referring now to FIG. 7E which illustrate an example search results GUI for the search user, according to at least one example embodiment, the search user may receive the search results generated by the neural network and/or the server 130 and/or the additional images uploaded by one or more responding users in section 780 of the GUI. Further, the GUI may display messages input by the responding user(s) in section 785, as well as the additional information input by the responding user(s) and/or determined characteristics generated by the neural network and/or server 130, etc., as well as GUI elements which allow the search user to evaluate and/or confirm the similarity score and/or relevance score of the search results and/or the determined characteristics of the search results, etc.

In operation S470, the server 130 may update the training of the neural network and/or update the database associated with the neural network and/or the online platform, by storing the uploaded search image in association with the search user provided search parameters, additional information, the initial search results, and/or the determined characteristics, as well as the verification responses from the responding users and/or the search user. The training of the neural network will be discussed in further detail in connection with FIGS. 6A to 6B.

In operation S480, the server 130 may determine whether additional searching is desired based on the similarity scores and/or relevance scores associated with the search results received from the responding users and/or the search user, or the server 130 may determine that additional searching is desired based on an input received from the search user. If the additional searching is determined to be desired, the server 130 proceeds to operation S410.

Figure 5A:
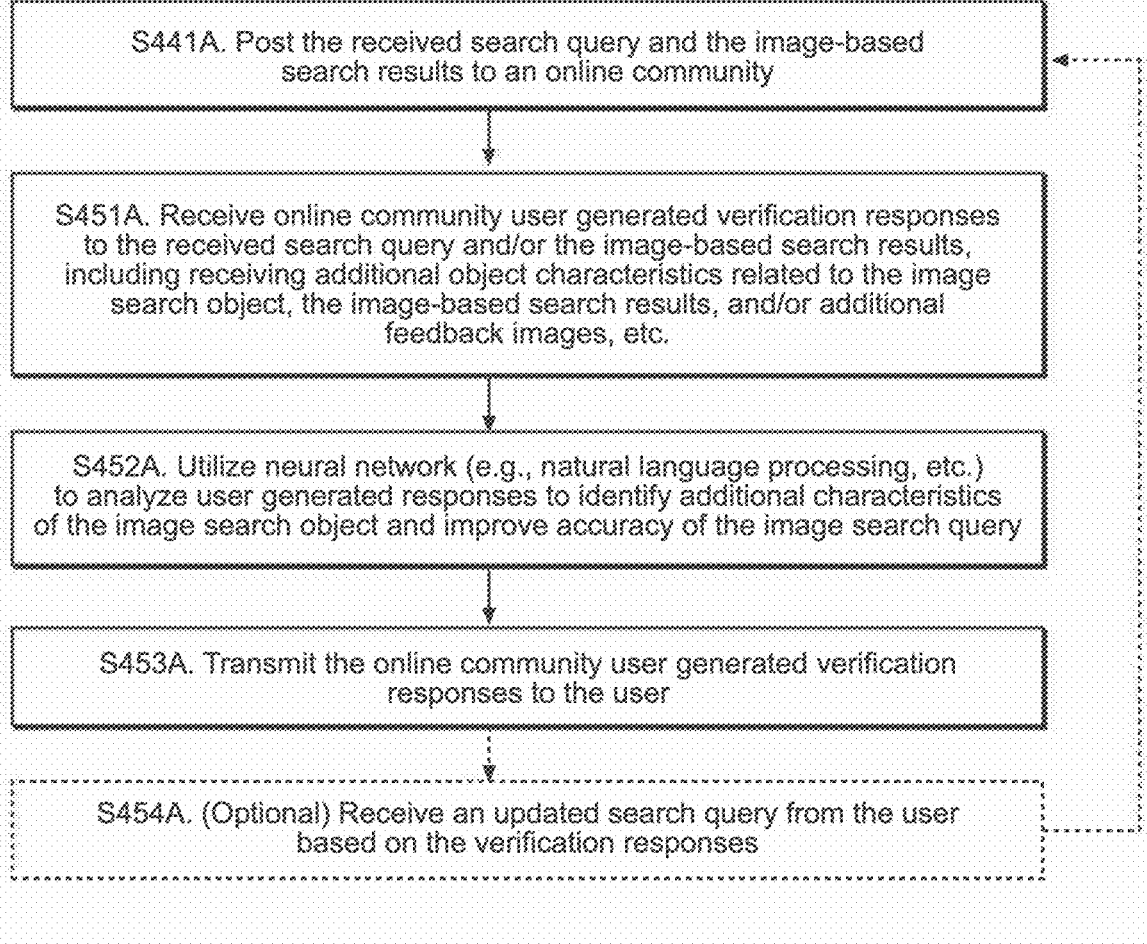

FIGS. 5A to 5B illustrate methods for receiving verification feedback of an image-based search according to some example embodiments.

Referring now to FIG. 5A, according to at least one example embodiment, in operation S441A, the search user may further specify a first search type corresponding to the search query be posted to an online community (e.g., forum, discussion board, chat group, messaging group, virtual conference, sub-section, etc.) of the online platform. The server 130 may then post, publish the search user's search query to the online community of the online platform, and/or otherwise transmit the search query as a message to the participants of the online community. In operation S451A, the server 130 may receive verification responses from the online community users, including receiving additional images related to the search object, additional information related to the search object, messages from the community participants, feedback regarding the initial search results and/or the determined characteristics of the search object generated by the neural network, etc. In operation S452A, the server 130 may transmit the responses from the community participants to the search user and/or post and/or publish the responses in the online community. The responses from the community participants are analyzed using natural language processing by the neural network to identify additional characteristics of the image search object based on metadata extracted from the response related to the image search object, and may be used to improve the accuracy of the image search query.

In operation S453A, the online community verification responses are transmitted to the search user for review.

In optional operation S454A, the search user may update the search query based on the responses received from the online community recipients and transmit the updated search query to the server 130, etc.

Referring now to FIG. 5B, according to at least one example embodiment, in operation S441B, the search user may specify a second search type corresponding to transmitting the search query to business accounts which may be relevant to the search query, for example, when the search user is attempting to search for a product or service. In other example embodiments, the search user may search for a manufacturer and/or supplier that is capable of producing a design, plan, blueprint, schematic, etc., provided by the search user, etc., however the example embodiments are not limited thereto. The neural network and/or the server 130 may search the database to determine whether any of the business accounts registered with the online platform are relevant to the search query, including for example, comparing the geographic location of the search user (and/or a desired geographic location input by the search user), any geographic restrictions input by the search user (e.g., limit the responses to business accounts within a 10 mile radius of the search user's current location, etc.), requesting responses from desired types of businesses, etc. Additionally, the neural network and/or server 130 may access the inventory information associated with the business accounts, such as real-time inventory information of the business accounts accessed via an API, to determine whether the search query, the initial search results and/or the determined characteristics generated by the neural network and/or server 130, etc., match with any of the products and/or services currently in the inventory of the business accounts, etc. The server 130 may select at least one business account determined to be relevant to the search query based on at least the above considerations.

In operation S451B, the server 130 transmits the search query, the initial search results, and/or the determined characteristics to the selected business accounts. In operation S452B, the server 130 receives the verification responses from the selected business accounts. The verification responses may include similarity scores and/or relevance scores associated with the initial search results and/or the determined characteristics, as well as additional information provided by the selected business accounts, additional images relevant to the search query provided by the selected business accounts, and/or messages from the selected business accounts, etc.

In operation S453B, the server 130 may transmit the verification responses received from the selected business accounts to the search user. In optional operation S454B, the search user may transmit a request to the server 130 to perform an updated search based on the verification responses, etc.

Figure 6A:
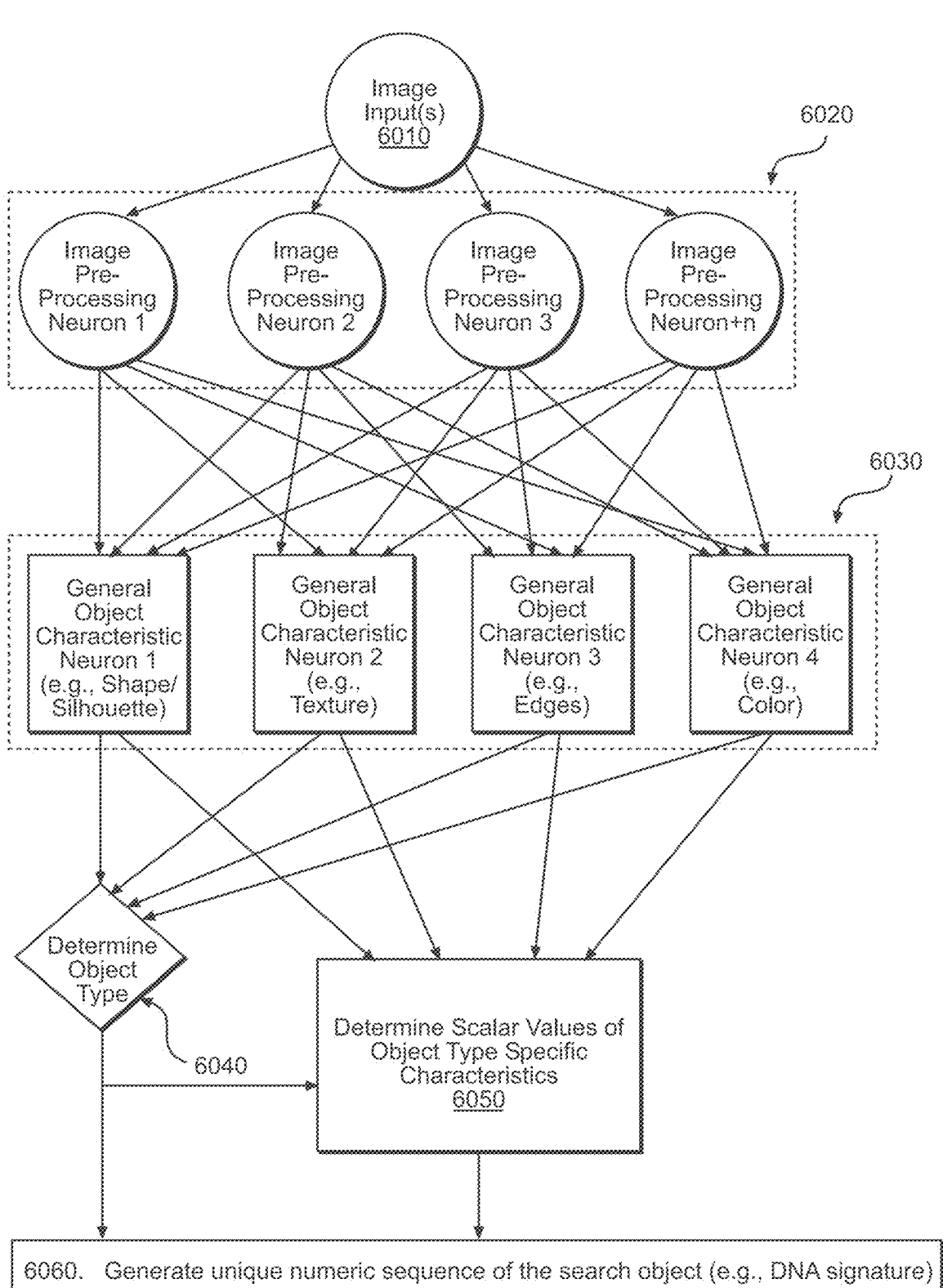
FIGS. 6A to 6B illustrate an example neural network according to some example embodiments.
Figure 6B:
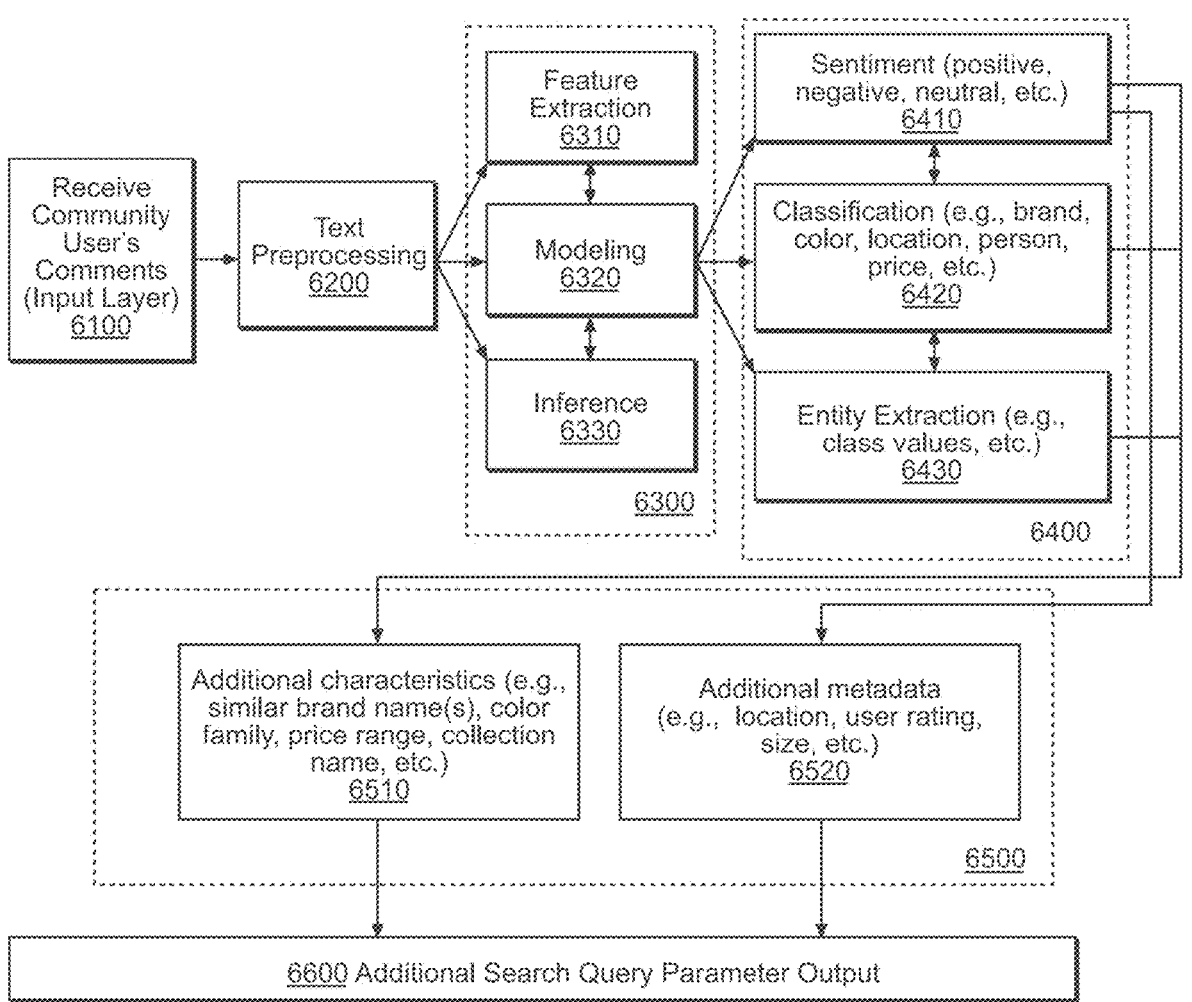

FIGS. 6A to 6B illustrate at least one example neural network executed by the server 130 according to some example embodiments. According to at least one example embodiment, in FIG. 6A, the neural network performs analysis of the search query using at least two neural network techniques, but the example embodiments are not limited thereto. As shown in FIG. 6A, a first analysis technique employed by the neural may be a Convolutional Neural Network (CNN). The CNN may include at least one image input layer 6010, at least one image preprocessing layer 6020, at least one general object characteristic layer 6030, an object type determination layer 6040, at least one object type specific characteristic determination layer 6050, and at least one DNA signature output layer 6060, etc., but the example embodiments are not limited thereto, and there may be a greater or lesser number of layers.

The CNN may receive the search image in the image input neuron 6010. The image input neuron 6010 may transmit the search image to the image preprocessing layer 6020. The image preprocessing layer 6020 may include at least one neuron for performing an initial image processing of the search image. The image preprocessing layer 6020 may include a plurality of image preprocessing neurons (e.g., image preprocessing neuron 1, image preprocessing neuron 2, image preprocessing neuron 3, . . . , image preprocessing neuron N, etc.) each configured to perform a specific image processing function on the search image in parallel. For example, the image preprocessing neuron 1 may be configured to separate the color information of the search image into separate color channels, etc. The image preprocessing neuron 2 may be configured to perform pixel extraction on each layer of the search image. The image preprocessing neuron 3 may be configured to analyze each layer of the search image to determine the boundaries of objects within the search image, an image preprocessing neuron 4 may be configured to determine shapes of objects within the search image, and other image preprocessing neurons may be configured to determine other information regarding the search image, etc.

The results of the image preprocessing neurons are then used by the neural network to determine the existence of any search objects included in the search image. The results of the image preprocessing neurons may also be used by the neural network to forward train and backward train the individual neurons of the neural network to improve accuracy of the existing search result set. Additionally, the output of the image preprocessing neurons (e.g., the determined search objects, if any, included in the search image) are transmitted to the at least one neuron of the general object characteristic layer 6030 to determine general object characteristics of the search object(s) identified in the search image. For example, the general object characteristic neurons may be configured to determine information regarding the shape of each of the determined search objects, the shadow/silhouette of each of the determined search objects, the texture of each of the determined search objects, the edges of each of the determined search objects, the color of each of the determined search objects, the size of each of the determined search objects, etc., but the example embodiments are not limited thereto. The general object characteristics neurons may be search object type agnostic, or in other words, may be determined for every type of search object.

The output of the at least one general object characteristic neuron is then transmitted to the object type determination layer 6040 and/or the object type specific characteristic determination layer 6050, but the example embodiments are not limited thereto. According to at least one example embodiment, at least one neuron of the object type determination layer 6040 determines what type of object is included in the search image based on the information output by the general object characteristic neuron(s). For example, the object type determination neuron may determine that the identified search object of a search image is a type of apparel (e.g., a wedding dress, etc.) an animal, a piece of jewelry, a car, a piece of equipment, a CAD design, etc., based on the determined general characteristics information regarding the shape/silhouette, texture, edge, color, and other information about the identified search object. Once the object type of the search object is determined by the object type determination neuron 6040 and/or the object type determination neuron 6040 confirms that the search image contains the search object type specified by the search user in the original search query, the neural network selects an appropriate set of object type specific neurons (e.g., the object type specific characteristics layer 6050) to further process the search object based on specific characteristics corresponding to the determined search object.

For example, if the object type is determined to be a wedding dress, the search object may be further analyzed by the at least one object type specific characteristics neuron 6050 to determine object type specific characteristics, such as the shape of the wedding dress, a silhouette of the wedding dress, a material type of the wedding dress, a neckline of the wedding dress, a sleeve length of the wedding dress, a lace position of the wedding dress, a dress length of the wedding dress, straps of the wedding dress, a back design of the wedding dress, a slit of the wedding dress, a belt/sash of the wedding dress, an overskirt of the wedding dress, a bow position of the wedding dress, a bow size of the wedding dress, a beading position of the wedding dress, a ruffle position of the wedding dress, a ruffle style of the wedding dress, a cutout/illusions of the wedding dress, a train length of the wedding dress, a train style of the wedding dress, a lace pattern of the wedding dress, a color family of the wedding dress, a fabric of the wedding dress, a beading style of the wedding dress, other miscellaneous design features of the wedding dress, etc., or any combinations thereof.

As a second example, if the object type is a ring, the at least one object type specific characteristics neuron 6050 may determine ring-specific characteristics, such as ring type (e.g., wedding band, engagement ring, etc.), number of stones, stone types, cut, material, gender, stone setting type, band width, inscription, etc.

As a third example, if the object type is a car, the at least one object type specific characteristics neuron 6050 may determine car specific characteristics, such as vehicle type (e.g., car, truck, van, bus, etc.), number of doors, roof type, body shape, car manufacturer, color, accessories, interior details, options, front end shape, rear end shape, side shape, etc.

The at least one object type specific characteristics neuron 6050 may output scalar values associated with each of the object type specific characteristics analyzed by the object type specific characteristics neuron 6050. The scalar values may be based on a desired numeric range (e.g., 0-100) for each characteristic. The scalar values are used to generate a unique sequence of numbers to use to identify the search object, even among search objects of the same object type, and may be referred to as being the "DNA signature" of the search object of the search image. This unique numeric sequence may then be used to identify matching and/or similar objects in the database of the neural network and/or server 130.

Referring now to FIG. 6B, according to at least one example embodiment, the neural network and/or server 130 may further determine additional characteristics of the search object based on textual information analyzed using natural language processing by the neural network. The neural network may analyze the community-generated feedback, user profile information, messaging histories, etc., of users to generate additional information regarding the search object. Utilizing Natural Language Processing (NLP), the neural network may determine information like sentiment, brand, color, price, location, etc. from the user-generated comments which are associated with the search object in the database of the neural network and used to forward and backward train the neural network. Additionally, the natural language processing analysis of the user-generated comments and/or textual information may also be associated with the users of the online platform which provided the comments and/or textual information regarding the search object so that these users may be selected as the business account(s) and/or to the personal accounts to solicit verification responses from in operation S450 of FIG. 4, etc.

As shown in FIG. 6B, the neural network may further include at least one text input layer 6100, at least one text preprocessing layer 6200, a lexical/semantic/syntactic analysis layer 6300 (e.g., text general characteristics layer, etc.), a morphological/pragmatic analysis layer 6400 (e.g., a text specific characteristics layer, etc.), an categorical/taxonomical analysis layer 6500 (e.g., an additional characteristic layer, etc.), and a scalar output layer 6660, etc., but the example embodiments are not limited thereto. Additionally, according to some example embodiments, the neural network may include a greater or lesser number of constituent layers and/or neurons than shown in FIG. 6B, and for example, two or more neurons and/or layers may be combined into a single neuron and/or layer, and/or the functionality of one or more neurons and/or layers may be performed by a plurality of neurons and/or layers, etc. For example, the lexical/semantic/syntactic analysis layer 6300 and the morphological/pragmatic analysis layer 6400 may be combined into a single layer, but the example embodiments are not limited thereto.

According to at least one example embodiment, the at least one text input layer 6100 (e.g., a text input neuron, etc.) receives the community user responses (e.g., the verification responses, etc.) from the online platform. The received text of the responses is transmitted to the text preprocessing neuron 6200 and the text preprocessing neuron 6200 removes textual noise from the received response(s), such as the removal of contractions, correction of spelling errors, removal of word articles, standardization of word tenses, removal of special characters, etc., but the example embodiments are not limited thereto.

Next, the output of the at least one text input layer 6100 is transmitted to the lexical/semantic/syntactic analysis layer 6300. The lexical/semantic/syntactic analysis layer 6300 may include at least one neuron for performing feature extraction (e.g., neuron 6310), modeling (e.g., neuron 6320), and/or determining inference (e.g., neuron 6330), etc., but the example embodiments are not limited thereto, and there may be a greater or lesser number of neurons included in layer 6300. More specifically, the feature extraction neuron 6310 may be configured to analyze the preprocessed text to extract features (e.g., keywords, keyword strings, etc.) related to a sentiment of the text, a word density of the text, word/phrase ranking of the text, etc., by analyzing the lexicon, semantics, and/or syntax of the preprocessed text, but the example embodiments are not limited thereto. For example, the feature extraction neuron 6310 may identify and extract keywords related to sentiment based on analysis of the adjectives and/or verbs included in the text (e.g., "great," "poor," "happy," "disappointed," "return," "bought," "need," "want," etc.), punctuation/emojis (e.g., the use of exclamation points, happy face emojis, sad face emojis, numeric ratings, etc.), etc.; may determine the word density of the text based on the total number of words in the text (e.g., higher word count text being given a higher weight, etc.), formatting of the text (e.g., the use of complete sentences and/or paragraphs being given a higher weight in comparison to one word responses, etc.), etc.; ranking of desired keywords, etc., but the example embodiments are not limited thereto.

Additionally, the modeling neuron 6320 may be configured to identify patterns in the sentences and/or paragraphs of the preprocessed text in order to classify the preprocessed text (e.g., determine whether the text patterns are relevant for, directed to, related to, and/or correspond to desired and/or predefined classes and/or classification categories). For example, the modeling neuron 6320 may identify and/or determine which classification categories (e.g., classes and/or categories related to names of people, places, types of objects (e.g., types of dresses (e.g., wedding dresses, ball gowns, casual dresses, etc.), types of rings, types of shoes, types of cars, etc.), locations, colors, price ranges, etc.) that the preprocessed text is relevant for based on analysis of the text, but the example embodiments are not limited thereto. Further, the inference neuron 6330 may be configured to extend the understanding of the preprocessed text to more than what is written, or in other words to infer additional information based on the actual text provided by the responsive user. For example, if a user comment includes the text "I know that store only has plus sizes available" the inference neuron 6330 infers that the specified store has "available sizes, 8, 9, 10, 12, 14, etc.," but the example embodiments are not limited thereto.

Once the text has been processed by the lexical/semantic/syntactic analysis 6300 (e.g., a general characteristics layer, a first natural language processing layer, a general analysis layer, etc.), the results of the analysis by the lexical/semantic/syntactic analysis layer 6300 is transmitted to the morphological/pragmatic analysis layer 6400 (e.g., text specific characteristic layer). The morphological/pragmatic analysis layer 6400 may include a sentiment neuron 6410, a classification neuron 6420, an entity extraction neuron 6430, etc., but the example embodiments are not limited thereto. According to at least one example embodiment, the sentiment neuron 6410 may be configured to determine whether features extracted by the lexical/semantic/syntactic analysis 6300 contain a sentiment, such as a positive, negative, and/or neutral, etc., sentiment, but the example embodiments are not limited thereto. The classification neuron 6420 may be configured to determine and/or identify any sub-classification categories (and/or sub-classes) related to the classification of the preprocessed text determined by the modeling neuron 6320, but the example embodiments are not limited thereto. For example, if the preprocessed text is determined to be related to the classification category wedding dresses by the modeling neuron 6320, the classification neuron 6420 may further determine that sub-categories relevant to the wedding dress category are brand, color, location, etc., and that values related to brand, color, and/or location may be extracted and/or inferred from the preprocessed text, but the example embodiments are not limited thereto. The entity extraction neuron 6430 may then receive the results of the classification neuron 6420 and may be configured to extract and/or infer the actual value of the classifications and/or sub-classifications from the preprocessed text. For example, if a user comment includes the text "I wouldn't get Brand XOXO's dress" the sentiment neuron 6410 of the morphological/pragmatic analysis layer 6400 identifies the sentiment of the user comment as being "negative," while the classification neuron 6420 extracts the word "dress" and the context of the user comment, e.g., the search query to which the user comments is in response, to determine that the classification category is dress, and the sub-classification category is dress brands, and the extraction neuron 6430 would extract "XOXO" as the actual value of the brand related to the user comment, but the example embodiments are not limited thereto. Additionally, according to some example embodiments, the text general characteristics layer 6300 and the text specific characteristic layer 6400 may be combined into a single layer, but the example embodiments are not limited thereto.

Next, the results of the natural language processing analysis performed by the morphological/pragmatic analysis layer 6400 (e.g., a specific characteristic layer, a second natural language analysis layer, a comprehensive analysis layer, etc.) is output to the categorical/taxonomical analysis layer 6500 (e.g., additional characteristic layer). The categorical/taxonomical analysis layer 6500 may include an additional characteristic neuron 6510, and an additional metadata neuron 6520, etc., but the example embodiments are not limited thereto. The additional characteristic neuron 6510 may be configured to assign scalar values for attributes determined as "additional characteristics" related to the classification category sub-classification categories, and/or extracted entity values of the preprocessed text, etc., but the example embodiments are not limited thereto. For example, the additional characteristics may be attributes which contribute to the uniqueness of the extracted entity value of the user comment, such as color family, similar brands, collection to which the extracted entity value belongs to and/or similar collections, etc. The additional metadata neuron 6520 may be configured to assign scalar values for attributes determined as relevant "metadata" related to the search query and/or user comment, and include attributes that may not be unique to the user comment and/or search query, but can be used as additional filters for the user's search, such as location, user rating, size, etc.

Finally, the results of the additional characteristic layer 6500 are output to the additional search query output layer 6660 (e.g., scalar output layer). The output neuron of the additional search query output layer 6660 may be configured to aggregate the scalar values output by the additional characteristics 6510 and additional metadata 6520 to assign priority and/or relevance values (e.g., weights, etc.) to each determined additional attribute and/or each determined additional metadata, and the determined additional attributes and/or determined additional metadata which are assigned priority and/or relevance values that are above a desired threshold may be used as additional search query parameters (e.g., additional search keywords, etc.) for use with the user's original search query. The additional search query parameters may be used to further filter the search results generated from the search query to provide more accurate and/or relevant search results. According to some example embodiments, the desired threshold may be set and/or adjusted by a user, administrator, and the like, or may be automatically set and/or adjusted based on experimental data and/or training of the natural language processing operations of the neural network.

While FIGS. 4 to 7E illustrate various methods for performing an image-based search using a neural network and training a neural network, and/or example GUIs related to the online platform, the example embodiments are not limited thereto, and other methods may be used to perform the image-based searching of the example embodiments.

Various example embodiments are directed towards an improved image-based searching system for users using a neural network based on verification feedback received from at least one third party user of an online platform. At least one example embodiment provides for continuous training of the neural network based on verification of the search results provided by the neural network. Additionally, at least one example embodiment provides a plurality of image search types which leverage the expertise and/or experiences of an online platform community to provide verified search results to a search user, as well as allowing the community of users to provide additional and/or update metadata associated with the image search.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A server for an online platform, the server comprising:

a memory storing computer readable instructions and a database corresponding to a neural network associated with the online platform; and processing circuitry configured to execute the computer readable instructions to cause the server to, receive an image-based search query from a first user using a first user device, the image-based search query including at least one search image including a search object, and search query parameters related to the search object, analyze the search object using the neural network to determine an object type of the search object and at least one object type specific characteristic of the search object, the analyzing the search object using the neural network including determining scalar values for each determined object type specific characteristic based on analysis of the search object, and generating a unique numeric sequence for the search object based on the scalar values, provide the image-based search query, the determined object type, the determined at least one object type specific characteristic, and the unique numeric sequence of the search object to at least one second user using at least one second user device, receive at least one search result response from the at least one second user using the at least one second user device, and transmit the at least one search result response to the first user device.

2. The server of claim 1, wherein the server is further caused to:

receive a confirmation response from the first user using the first user device; and train the neural network using natural language processing based on the received at least one search result response and the confirmation response.

3. The server of claim 1, wherein the server is further caused to perform the analysis of the search object using the neural network by:

performing image pre-processing of the at least one search image using the neural network;

determining general object characteristics of the search object based on results of the image pre-processing using the neural network;

determining the object type of the search object based on the determined general object characteristics using the neural network;

selecting a set of object-specific image analysis neurons of the neural network based on the determined object type of the search object; and determining the scalar values of each of the object type specific characteristics of the search object using the selected set of object-specific image analysis neurons.

4. The server of claim 3, wherein the determined object type is a dress; and the selected set of object type specific characteristic includes at least one neuron configured to analyze the at least one search image to determine a scalar value corresponding to at least one of a color family of the search object, a silhouette of the search object, a sleeve length of the search object, a lace pattern of the search object, a fabric of the search object, a lace position of the search object, a back design of the search object, a design features of the search object, a train style of the search object, or any combinations thereof.

5. The server of claim 1, wherein the server is further caused to:

select, using the neural network, the at least one second user from a plurality of second users associated with the online platform based on the unique numeric sequence of the search object and information related to the plurality of second users; and provide the at least one search image, the search query parameters, the determined object type of the search object, the scalar values of each determined at least one object type specific characteristic of the search object, and the unique numeric sequence of the search object to at least one second user device associated with the selected at least one second user.

6. The server of claim 1, wherein the server is further caused to:

select at least one business account as the at least one second user based on the determined object type of the search object, the unique numeric sequence of the search object, information associated with the at least one business account stored in the database, the scalar values of each determined at least one object type specific characteristic of the search object, and the search query parameters;

provide the image-based search query, the determined object type, the determined at least one object type specific characteristics, and the unique numeric sequence of the search object to at least one second user device associated with the selected at least one business account; and receive the search result response from the at least one second user device associated with the selected at least one business account.

7. The server of claim 6, wherein the information associated with the at least one business account includes real-time inventory information associated with the at least one business account; and the server is further caused to select the at least one business account based on the real-time inventory information associated with the at least one business account, the determined object type, the determined at least one object type specific characteristics, the unique numeric sequence of the search object, and the search query parameters.

8. The server of claim 1, wherein the server is further caused to:

select at least one personal account as the at least one second user based on information associated with the at least one personal account stored in the database, the determined object type, the determined at least one object type specific characteristics, the unique numeric sequence of the search object, and the search query parameters;

provide the image-based search query, the determined object type, the determined at least one object type specific characteristics, and the unique numeric sequence of the search object to at least one second user device associated with the selected at least one personal account; and receive the search result response from the at least one second user device associated with the at least one personal account.

9. The server of claim 8, wherein the information associated with the at least one personal account includes history information associated with the at least one personal account; and the server is further caused to select the at least one personal account based on the history information associated with the at least one personal account, the determined object type, the determined at least one object type specific characteristics, the unique numeric sequence of the search object, and the search query parameters.

10. The server of claim 1, wherein the search result response includes at least one of product information corresponding to the search object, at least one search result image associated with the search object, manufacturer information corresponding to the search object, vendor information corresponding to the search object, inventory status information corresponding to the search object, similarity information corresponding to the search object, vendor location information related to the search object, manufacturing capability information related to the search object, or any combinations thereof.

11. The server of claim 1, wherein the server is further caused to:

provide the image-based search query and determined general object characteristics of the search object to the at least one second user device by publishing the search query and determined general object characteristics in a forum related to the online platform.

12. A non-transitory computer readable medium including computer executable instructions, which when executed by processing circuitry of at least one server associated with an online platform, causes the at least one server to:

receive an image-based search query from a first user using a first user device, the image-based search query including at least one search image including a search object, and search query parameters related to the search object;

analyze the search object using a neural network associated with the online platform to determine an object type of the search object and at least one object type specific characteristic of the search object, the analyzing the search object using the neural network including determining scalar values for each determined object type specific characteristic based on analysis of the search object, and generating a unique numeric sequence for the search object based on the scalar values;

provide the image-based search query, the determined object type, the determined at least one object type specific characteristics, and the unique numeric sequence of the search object to at least one second user using at least one second user device;

receive at least one search result response from the at least one second user using the at least one second user device; and transmit the at least one search result response to the first user device.

13. The non-transitory computer readable medium of claim 12, wherein the at least one server is further caused to:

receive a confirmation response from the first user using the first user device; and train the neural network using natural language processing based on the received at least one search result response and the confirmation response.

14. The non-transitory computer readable medium of claim 12, wherein the at least one server is further caused to:

perform image pre-processing of the at least one search image using the neural network;

determine general object characteristics of the search object based on results of the image pre-processing using the neural network;

determine the object type of the search object based on the determined general object characteristics using the neural network;

select a set of object-specific image analysis neurons of the neural network based on the determined object type of the search object; and determine the scalar values of each of the object type specific characteristics of the search object using the selected set of object-specific image analysis neurons.

15. The non-transitory computer readable medium of claim 14, wherein the determined object type is a dress; and the selected set of object type specific characteristic includes at least one neuron configured to analyze the at least one search image to determine a scalar value corresponding to at least one of a color family of the search object, a silhouette of the search object, a sleeve length of the search object, a lace pattern of the search object, a fabric of the search object, a lace position of the search object, a back design of the search object, a design features of the search object, a train style of the search object, or any combinations thereof.

16. The non-transitory computer readable medium of claim 12, wherein the at least one server is further caused to:

select, using the neural network, the at least one second user from a plurality of second users associated with the online platform based on the unique numeric sequence of the search object and information related to the plurality of second users; and provide the at least one search image, the search query parameters, the determined object type of the search object, the scalar values of each determined at least one object type specific characteristic of the search object, and the unique numeric sequence of the search object to at least one second user device associated with the selected at least one second user.

17. The non-transitory computer readable medium of claim 12, wherein the at least one server is further caused to:

select at least one business account as the at least one second user based on the determined object type of the search object, the unique numeric sequence of the search object, information associated with the at least one business account stored in a database, the scalar values of each determined at least one object type specific characteristic of the search object, and the search query parameters;

provide the image-based search query, the determined object type, the determined at least one object type specific characteristics, and the unique numeric sequence of the search object to at least one second user device associated with the selected at least one business account; and receive the search result response from the at least one second user device associated with the selected at least one business account.

18. The non-transitory computer readable medium of claim 17, wherein the information associated with the at least one business account includes real-time inventory information associated with the at least one business account; and the server is further caused to select the at least one business account based on the real-time inventory information associated with the at least one business account, the determined object type, the determined at least one object type specific characteristics, the unique numeric sequence of the search object, and the search query parameters.

19. The non-transitory computer readable medium of claim 12, wherein the server is further caused to:

select at least one personal account as the at least one second user based on information associated with the at least one personal account stored in a database, the determined object type, the determined at least one object type specific characteristics, the unique numeric sequence of the search object, and the search query parameters;

provide the image-based search query, the determined object type, the determined at least one object type specific characteristics, and the unique numeric sequence of the search object to at least one second user device associated with the selected at least one personal account; and receive the search result response from the at least one second user device associated with the selected at least one personal account.

\* \* \* \* \*